(12) United States Patent
Takeshita et al.

(10) Patent No.: US 11,850,947 B2
(45) Date of Patent: *Dec. 26, 2023

(54) MOTOR VEHICLE

(71) Applicant: Kabushiki Kaisha F.C.C., Hamamatsu (JP)

(72) Inventors: Takaharu Takeshita, Nagoya (JP); Mahmoud Abdelnaby Sayed Abdallah, Hamamatsu (JP); Tatsuyuki Ohashi, Hamamatsu (JP)

(73) Assignee: Kabushiki Kaisha F.C.C., Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,853

(22) Filed: Nov. 16, 2021

(65) Prior Publication Data
US 2022/0161664 A1    May 26, 2022

(30) Foreign Application Priority Data

Nov. 24, 2020   (JP) .................................. 2020-194411

(51) Int. Cl.
*B60L 15/20* (2006.01)
*H02J 7/14* (2006.01)
(Continued)

(52) U.S. Cl.
CPC ................ *B60L 15/20* (2013.01); *B60L 7/12* (2013.01); *B60L 7/14* (2013.01); *B60L 7/26* (2013.01); *B60L 15/2009* (2013.01); *B60L 50/40* (2019.02); *B60L 50/66* (2019.02); *B60L 58/12* (2019.02); *H02J 7/1423* (2013.01); *H02M 7/5395* (2013.01); *H02P 27/08* (2013.01);
(Continued)

(58) Field of Classification Search
CPC ................ B60L 15/20; B60L 15/2009; B60L 2200/12; B60L 2240/421; B60L 2240/423; B60L 2240/547; B60L 50/40; B60L 50/66; B60L 58/12; B60L 7/12; B60L 7/14; B60L 7/26; H02J 7/1423; H02M 1/007; H02M 3/158; H02M 7/5395; H02P 27/08
USPC ........................................................ 318/139
See application file for complete search history.

(56) References Cited

U.S. PATENT DOCUMENTS

2016/0340865 A1* 11/2016 Takeo ..................... E02F 9/265
2018/0334046 A1* 11/2018 Lee ........................ B60L 15/007
2019/0288628 A1*  9/2019 Kobayashi ............ H02M 3/158

FOREIGN PATENT DOCUMENTS

JP            2018-166367 A        10/2018

* cited by examiner

*Primary Examiner* — Kawing Chan
*Assistant Examiner* — Zemenay T Truneh
(74) *Attorney, Agent, or Firm* — Harness, Dickey & Pierce, P.L.C.

(57) ABSTRACT

A motor vehicle has a motor, an inverter, a first power storage device, with a large-capacity characteristic, a second power storage device, with a high-power characteristic, a power converter and a circuit. The power converter has a voltage step down function during power driving. In the circuit, the power converter is connected to the first power storage device and the second power storage device. Thus, the first power storage device and the second power storage device are parallel to each other. During the power driving of the motor, the power converter steps down an output voltage of the first power storage device to supply energy from the first power storage device and the second power storage device to the inverter.

9 Claims, 23 Drawing Sheets

(51) Int. Cl.
*H02M 7/5395* (2006.01)
*H02P 27/08* (2006.01)
*B60L 50/40* (2019.01)
*B60L 7/12* (2006.01)
*B60L 58/12* (2019.01)
*B60L 50/60* (2019.01)
*B60L 7/14* (2006.01)
*B60L 7/26* (2006.01)

(52) U.S. Cl.
CPC ..... *B60L 2200/12* (2013.01); *B60L 2240/421* (2013.01); *B60L 2240/423* (2013.01); *B60L 2240/547* (2013.01)

[Fig. 1]
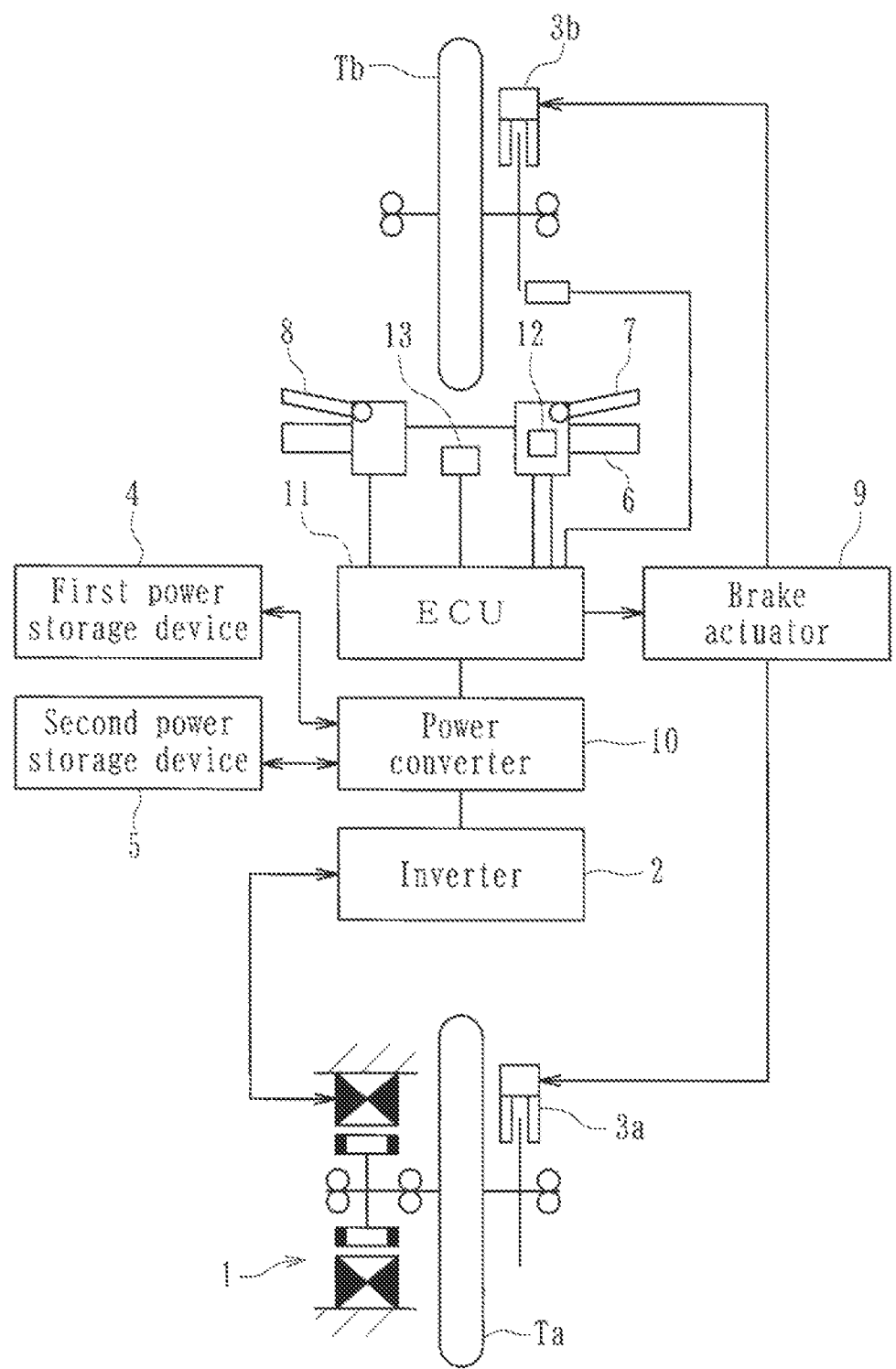

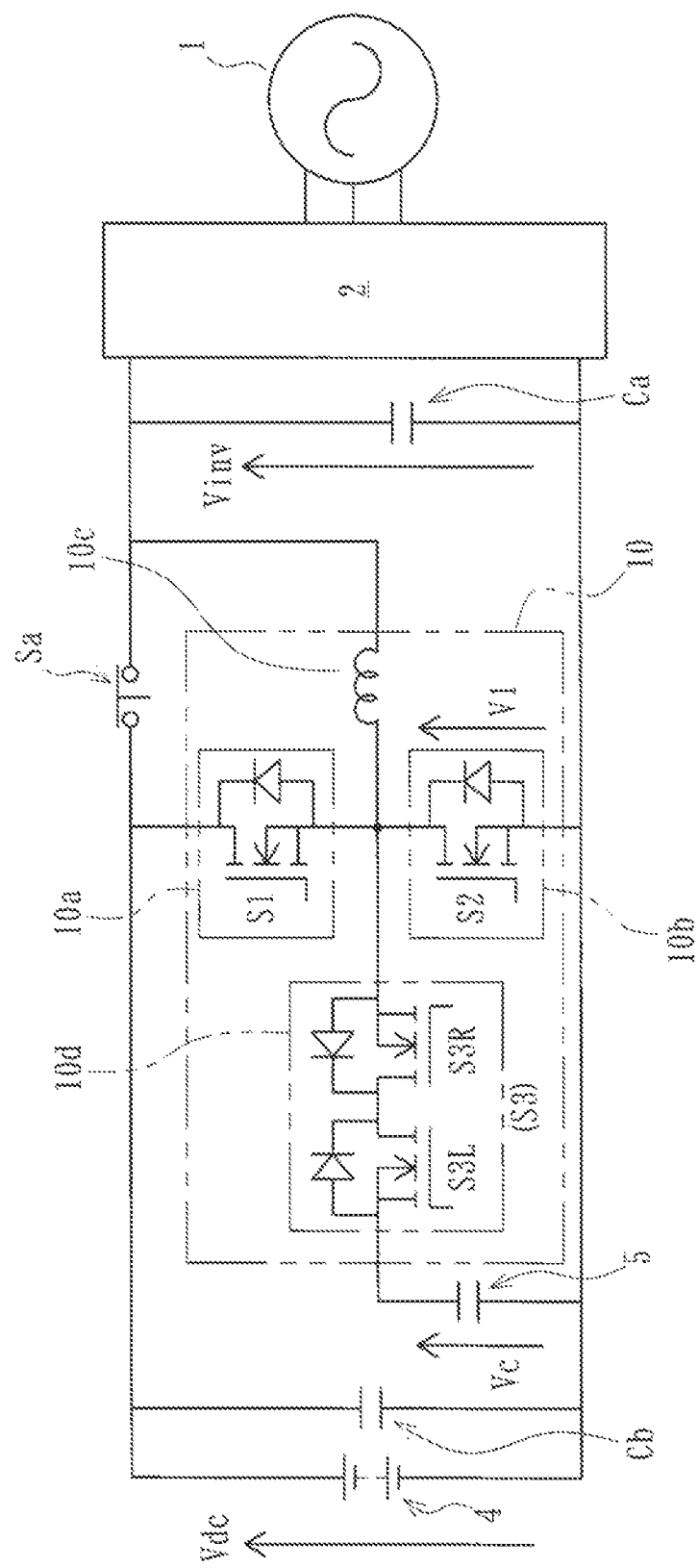
[Fig. 2]

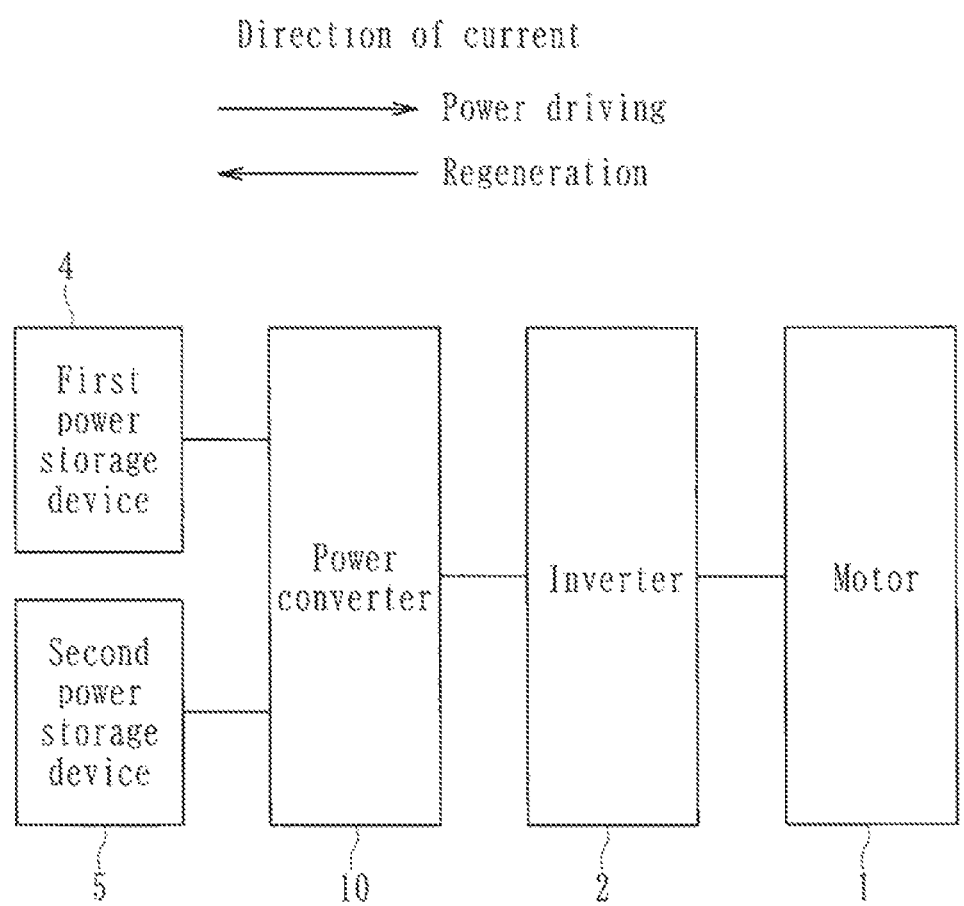

[Fig. 4]
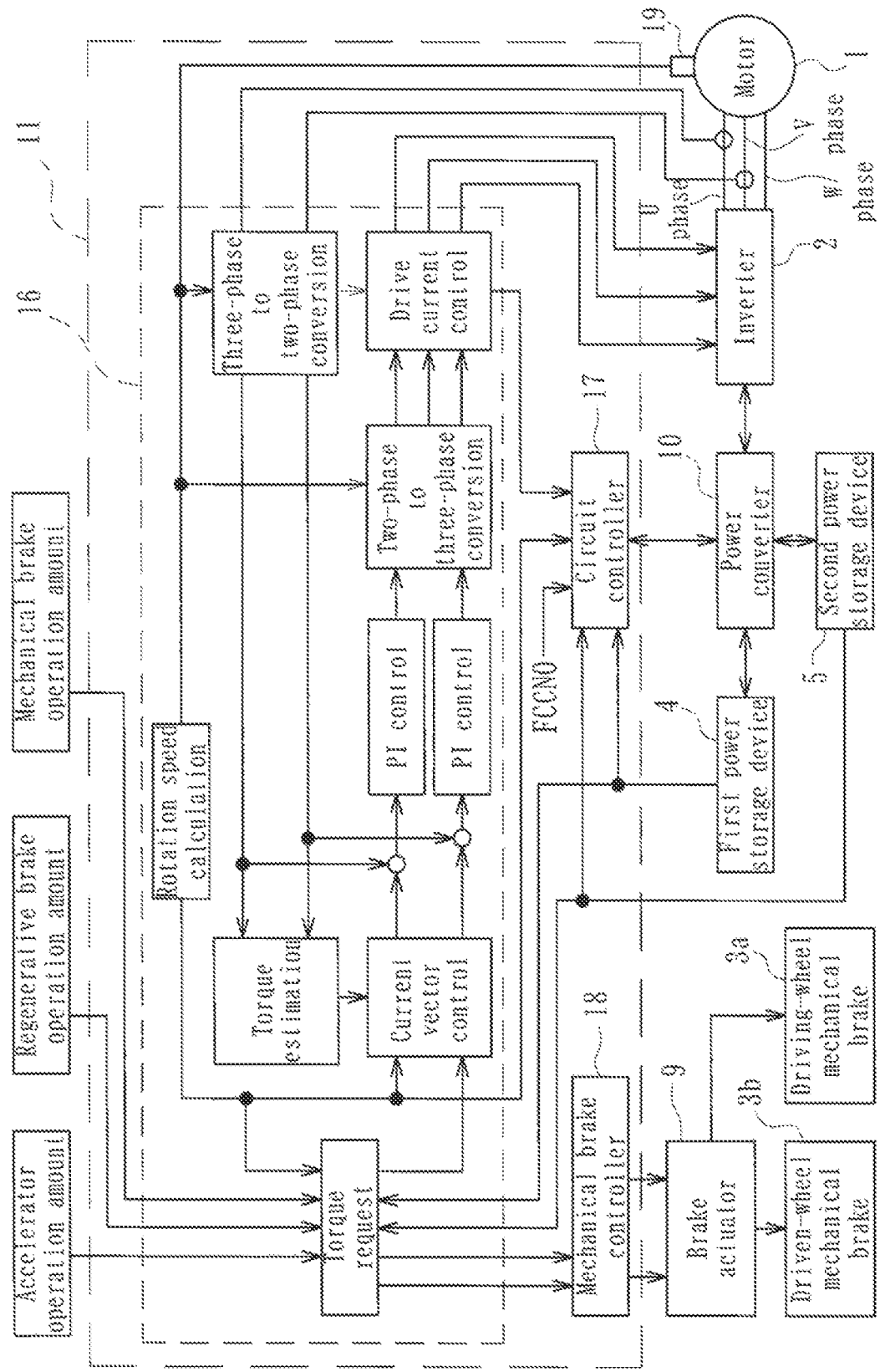

[Fig. 5]
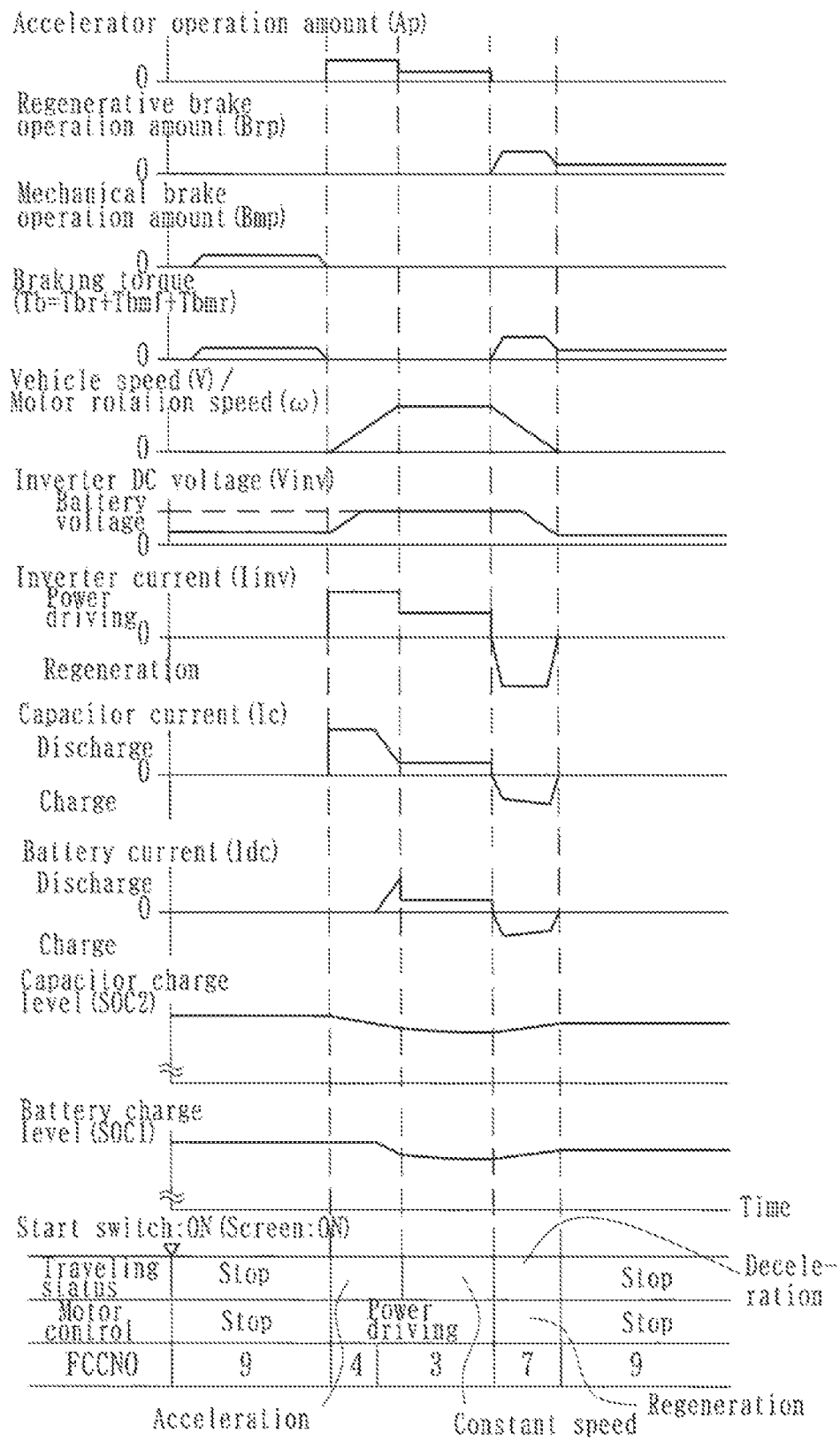

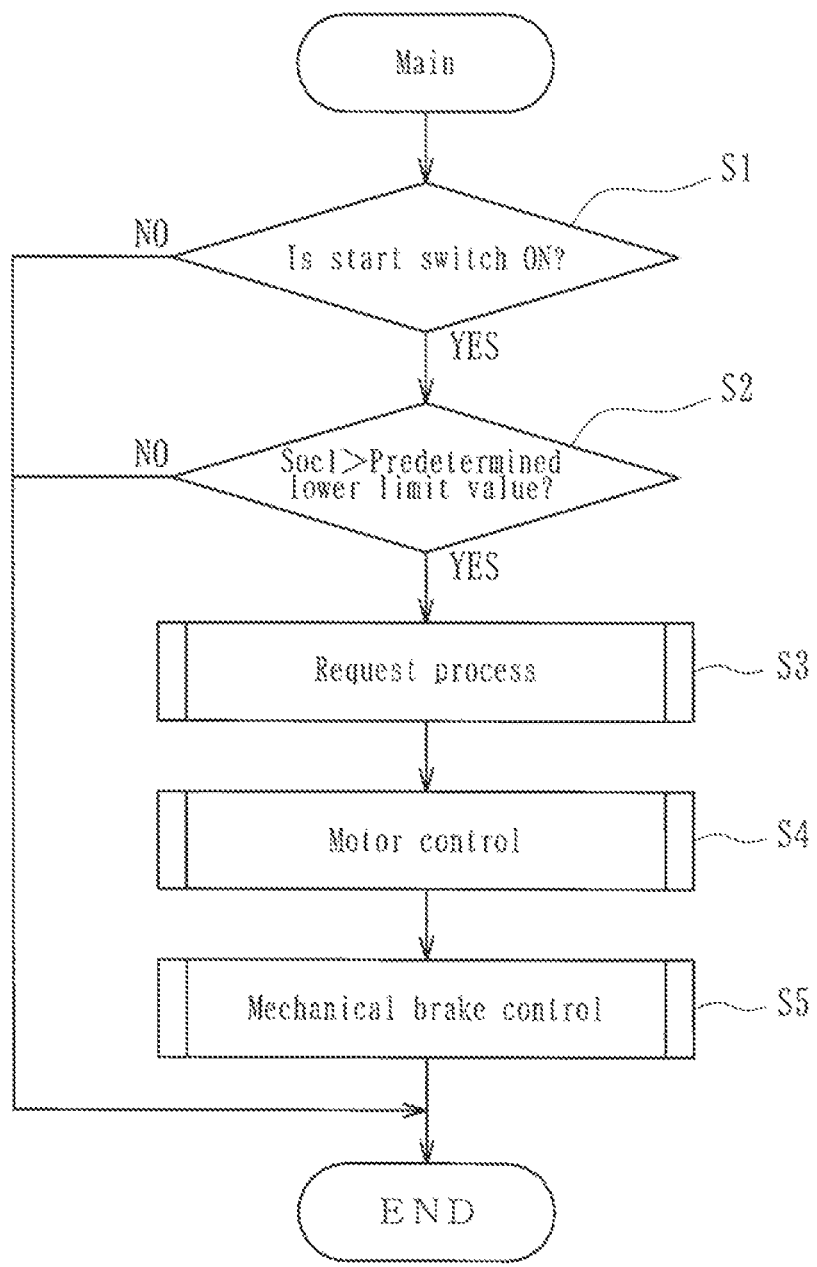
[Fig. 6]

[Fig. 7]
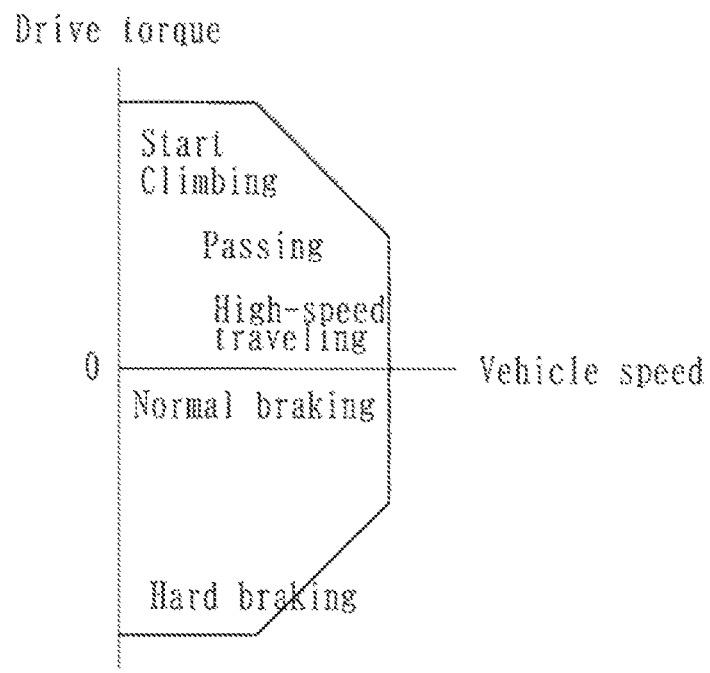
[Fig. 8]
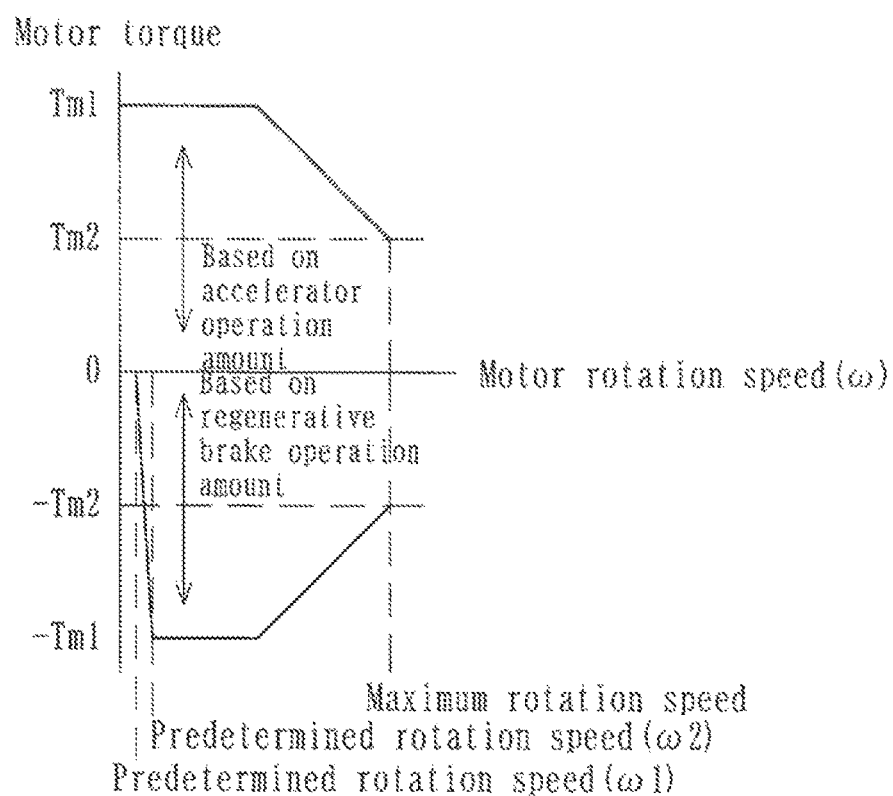

[Fig. 9]
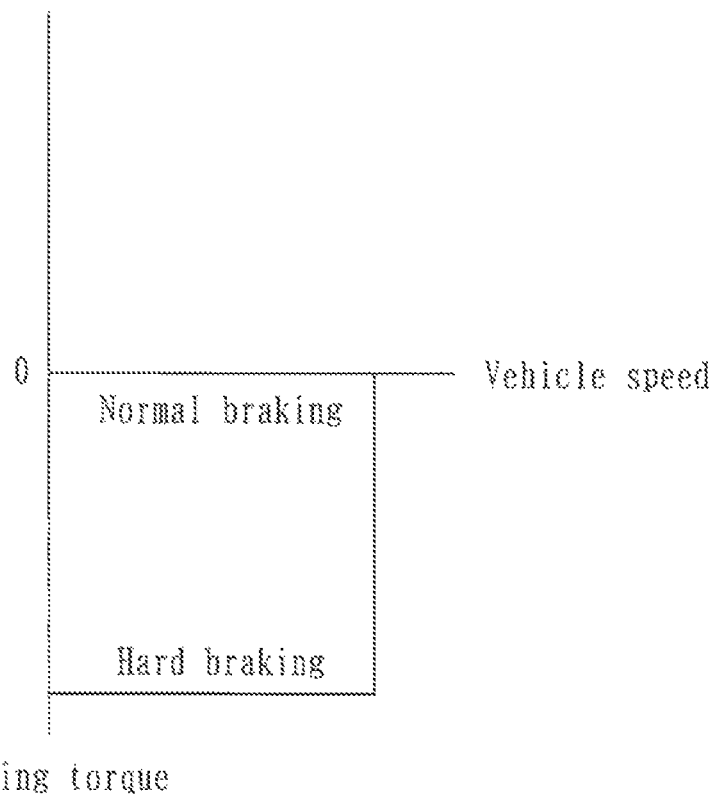
[Fig. 10]
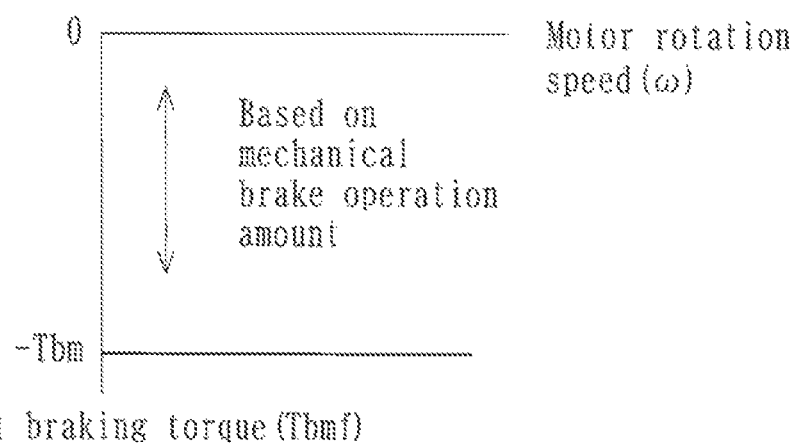

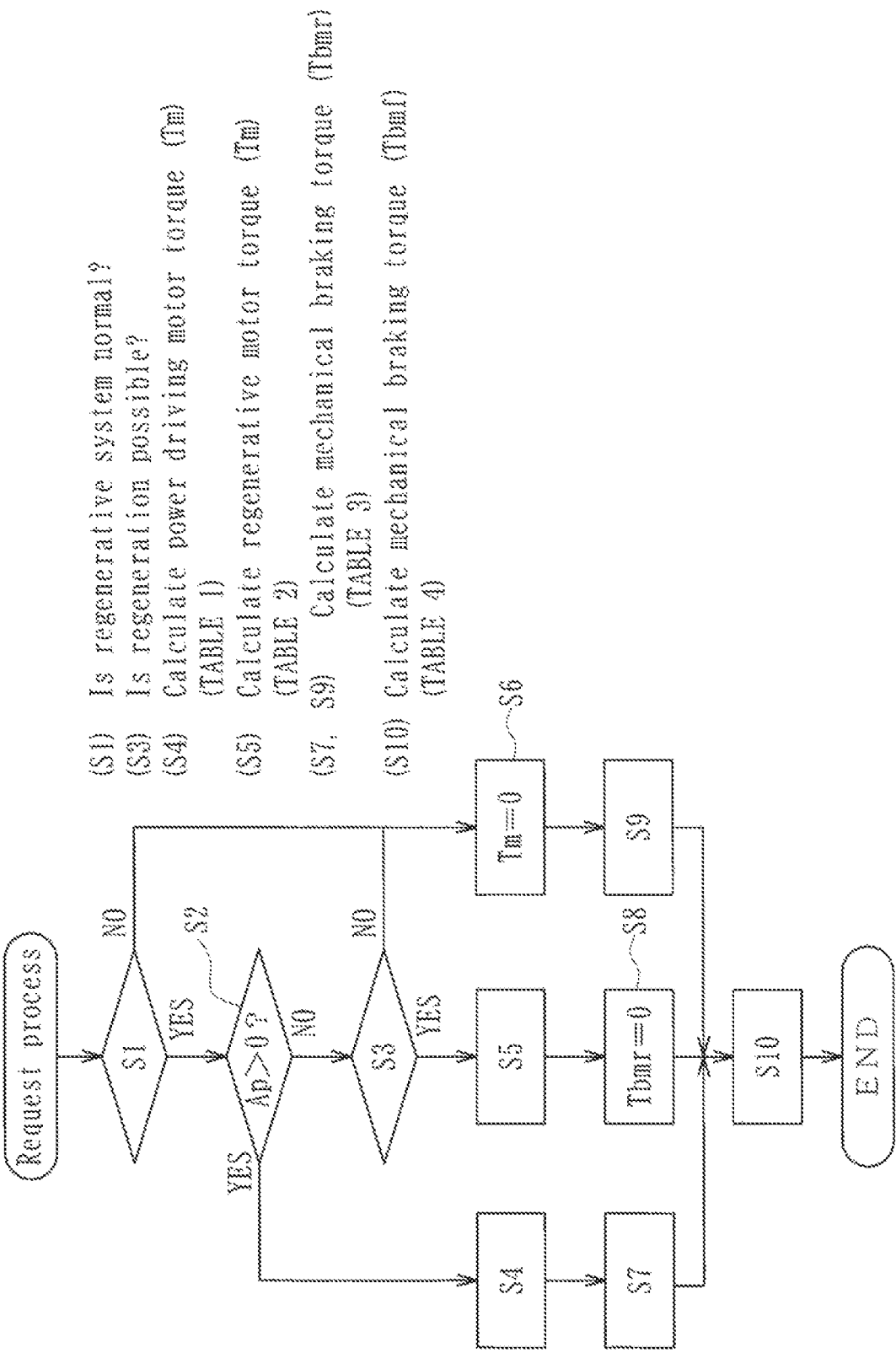

[Fig. 12]
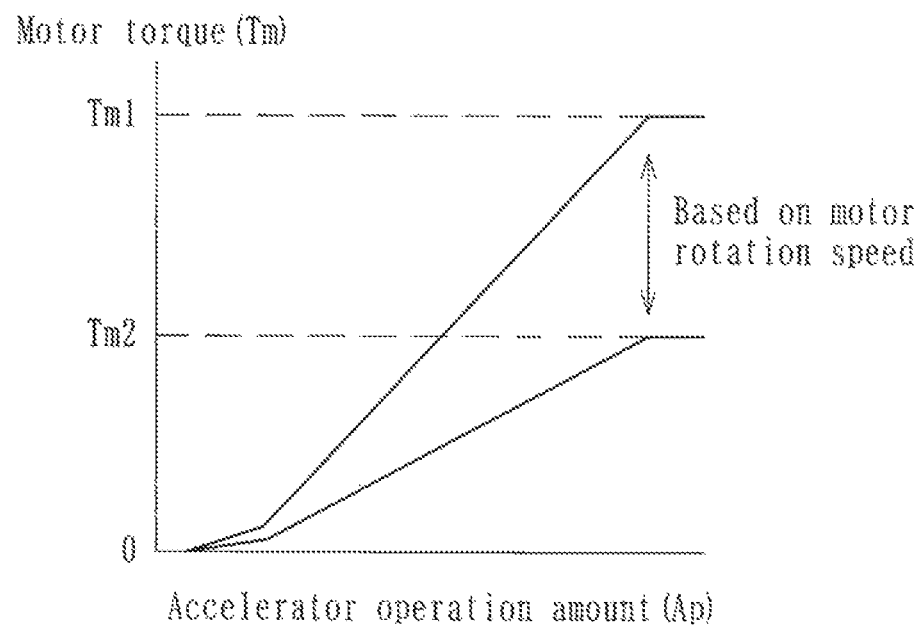
[Fig. 13]
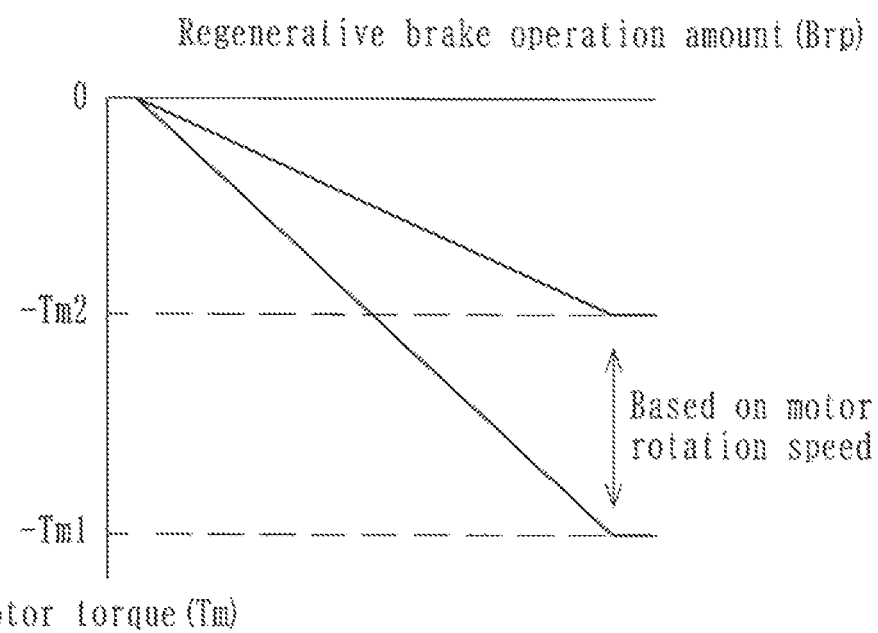

[Fig. 14]
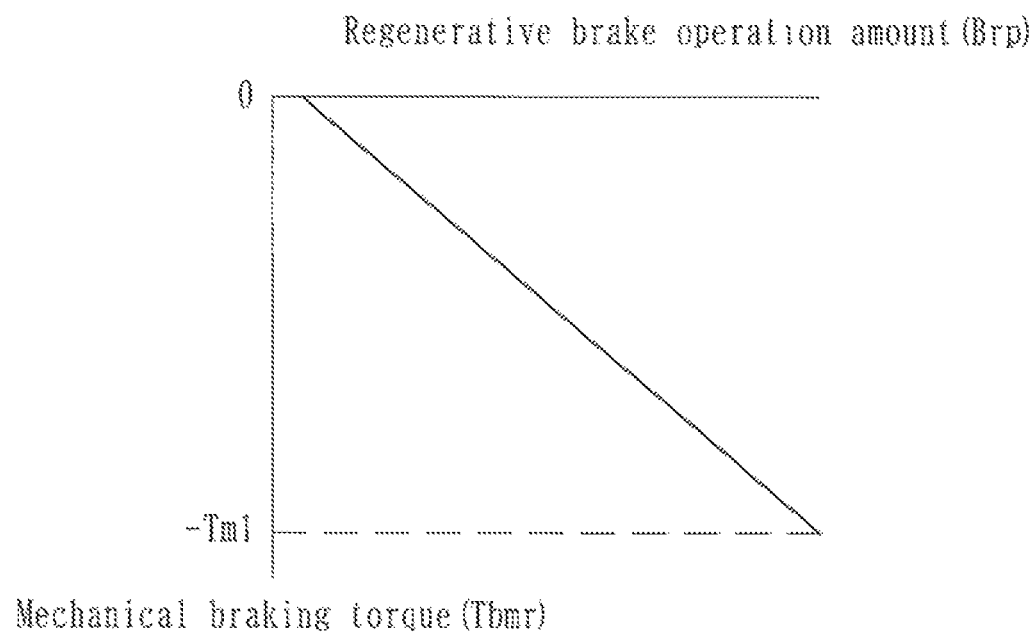
[Fig. 15]
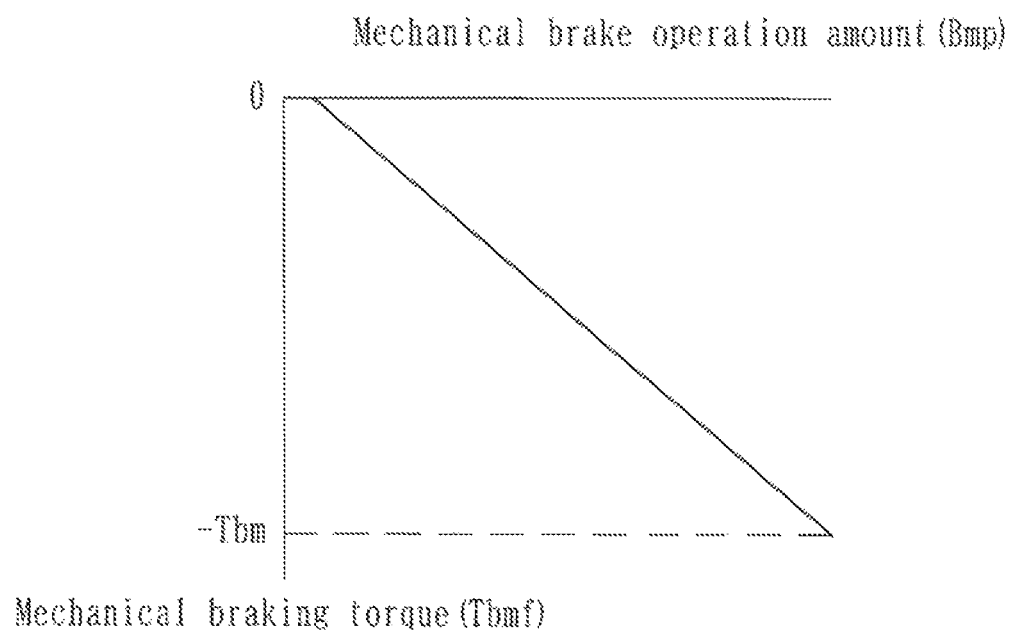

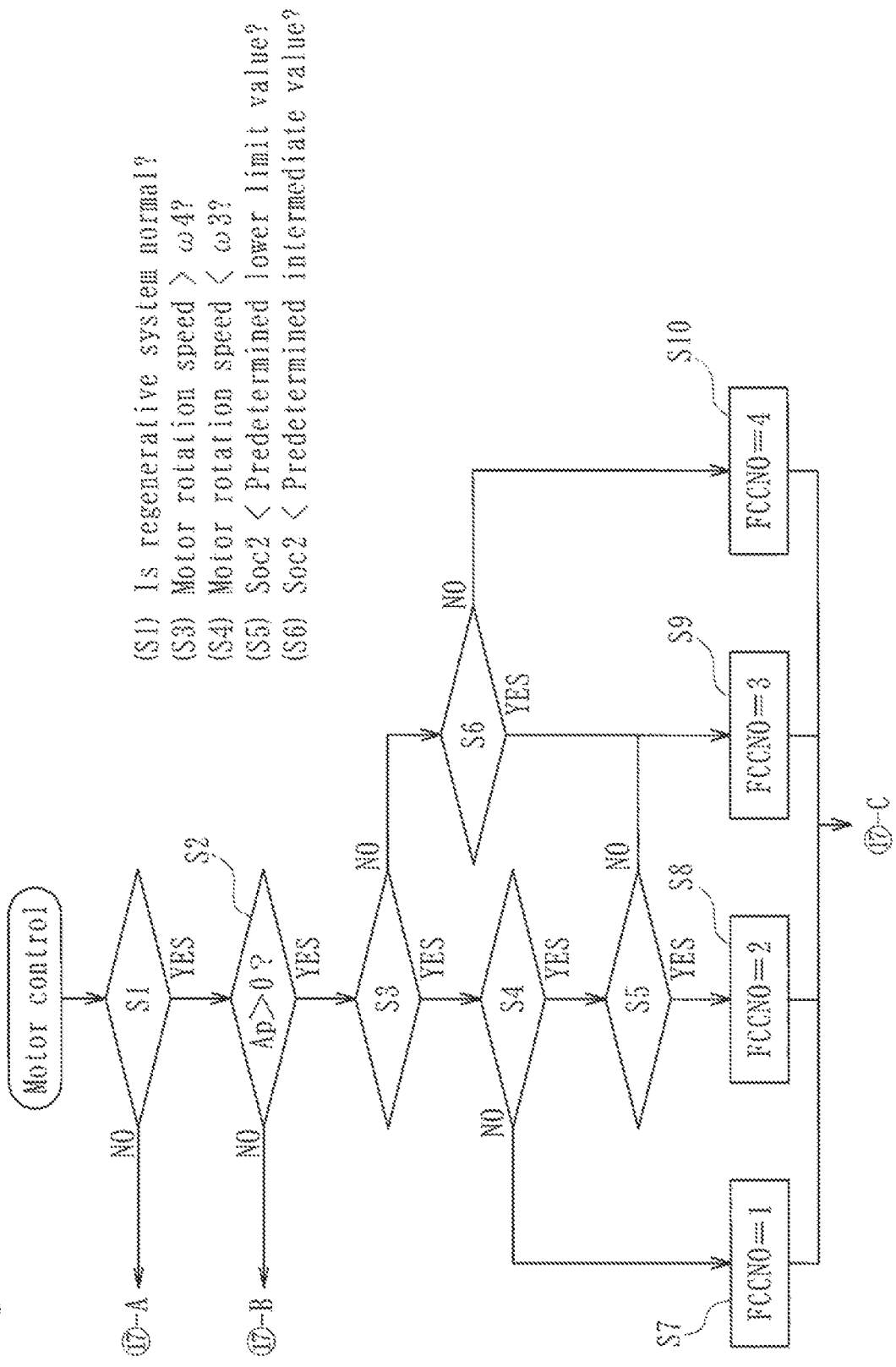

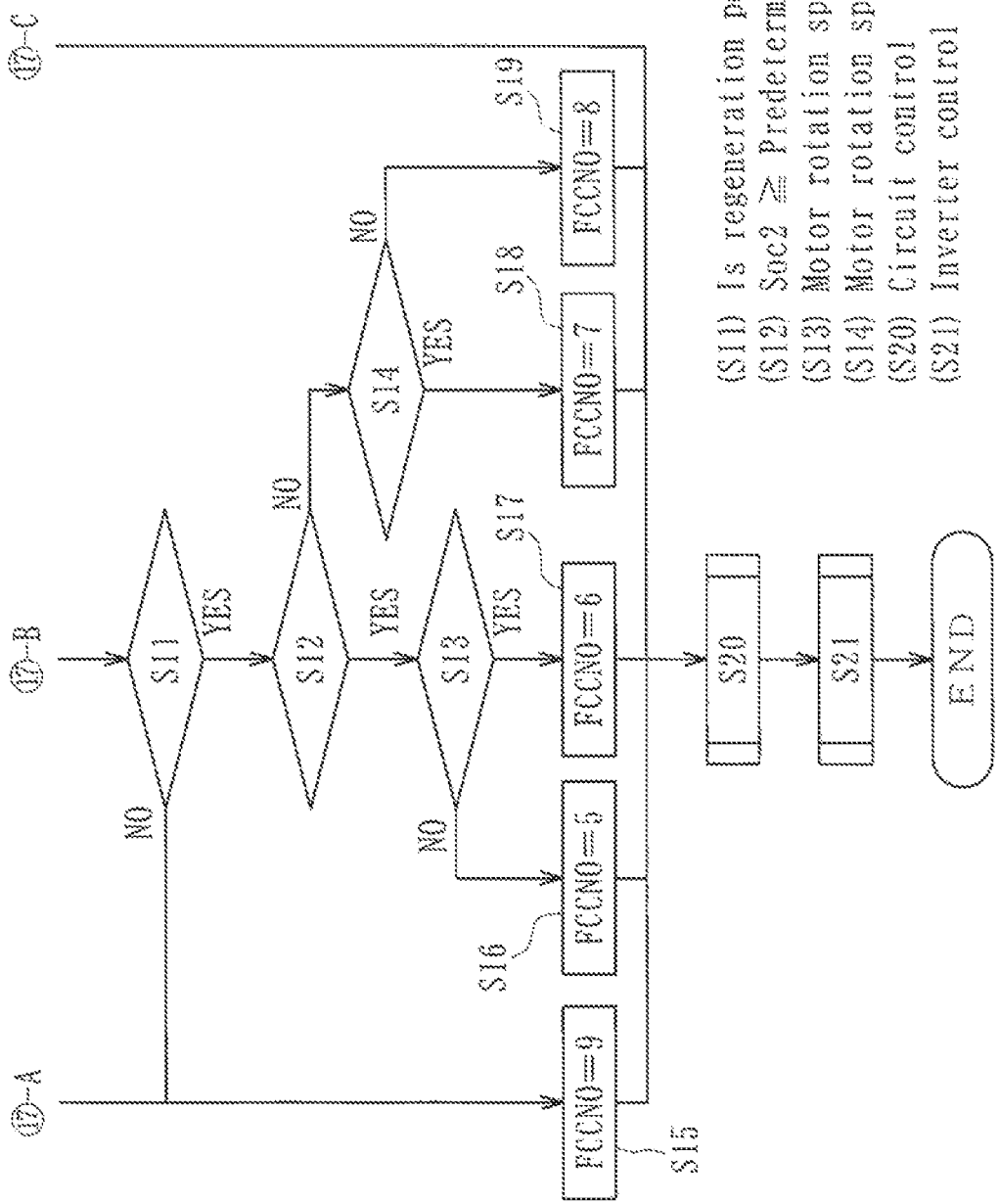
[Fig. 17]

[Fig. 18]

| Motor control | PCCNO | Circuit control mode | | | | SW | | | Remarks |
|---|---|---|---|---|---|---|---|---|---|
| | | Power converter | Use of battery | Use of capacitor | Inverter voltage | S1 | S2 | S3 | Sa | |
| Power driving | 1 | OFF | ○ | × | Vinv=Vdc | off | off | off | on | |
| Power driving | 2 | Step down for power driving | ○ | × | Vinv=V1<Vdc | duty | duty | off | off | Vinv characteristics: Table A |
| Power driving | 3 | Step down for power driving | ○ | ○ | Vinv=V1<Vdc | duty | duty | duty | off | Vinv characteristics: Table A |
| Power driving | 4 | Step down for power driving | × | ○ | Vinv=Vc | off | duty | duty | off | Vinv characteristics: Table A |
| Stop | 5 | OFF | ○ | × | Vinv=Vdc | off | off | off | on | |
| Regeneration | 6 | Step up for regeneration | ○ | × | Vinv=V1>Vdc | duty | duty | off | off | Vinv characteristics: Table B |
| Regeneration | 7 | Step up for regeneration | ○ | ○ | Vinv=V1>Vdc | duty | duty | duty | off | Vinv characteristics: Table B |
| Regeneration | 8 | Step up for regeneration | × | ○ | Vinv=V1>Vc | off | duty | duty | off | Vinv characteristics: Table B |
| Stop | 9 | OFF | × | × | | off | off | off | off | |

[Fig. 19]
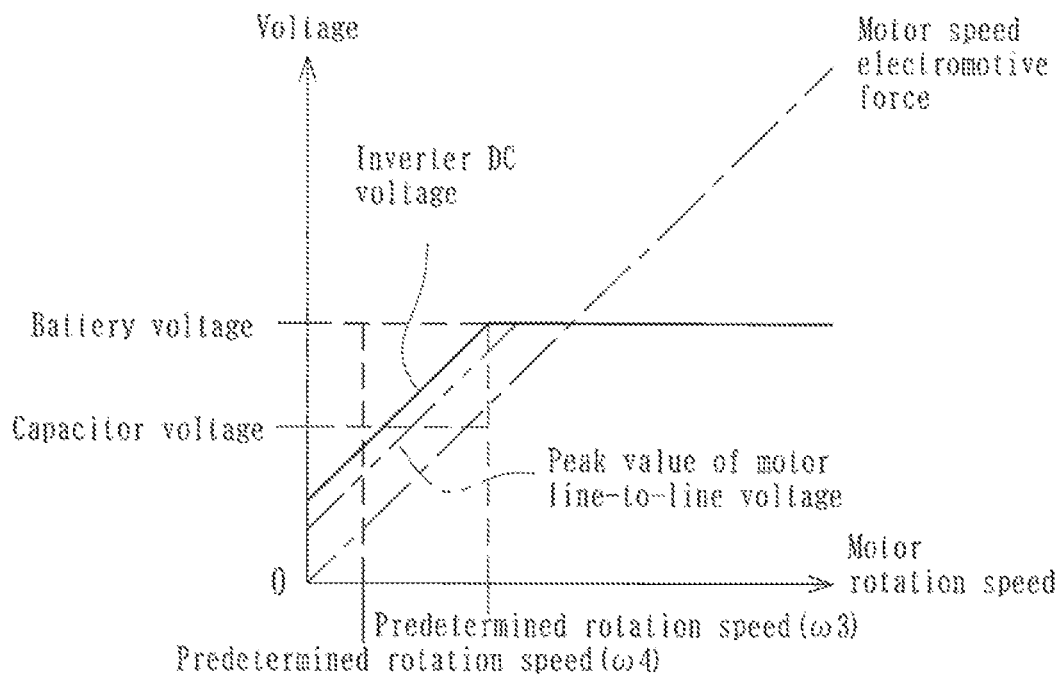
[Fig. 20]
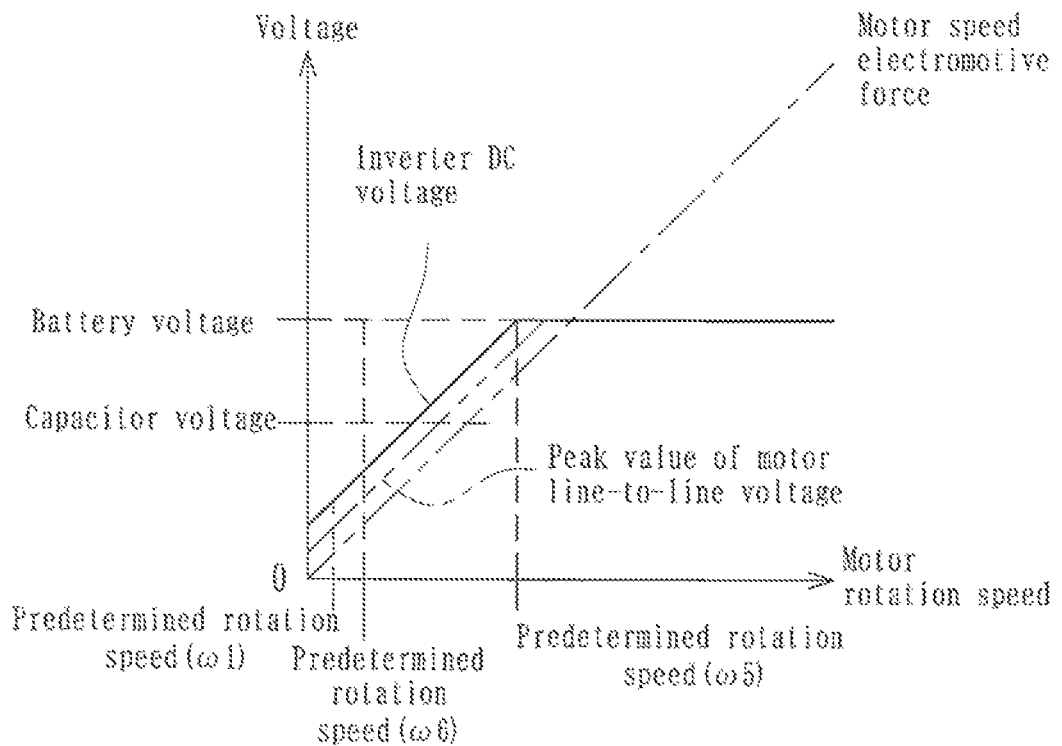

[Fig. 21]
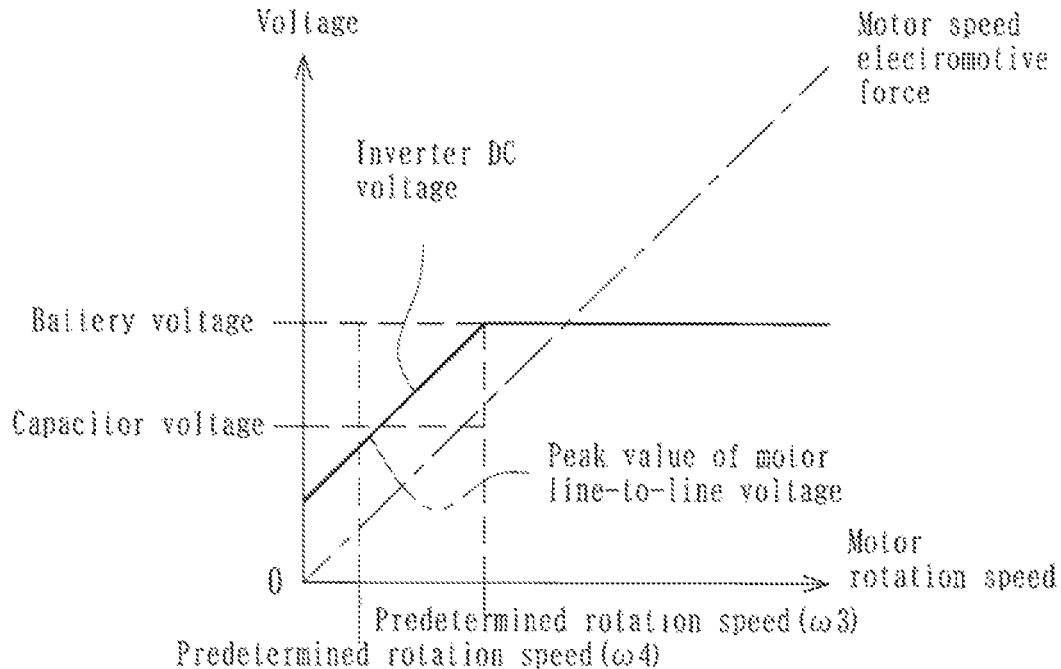
[Fig. 22]
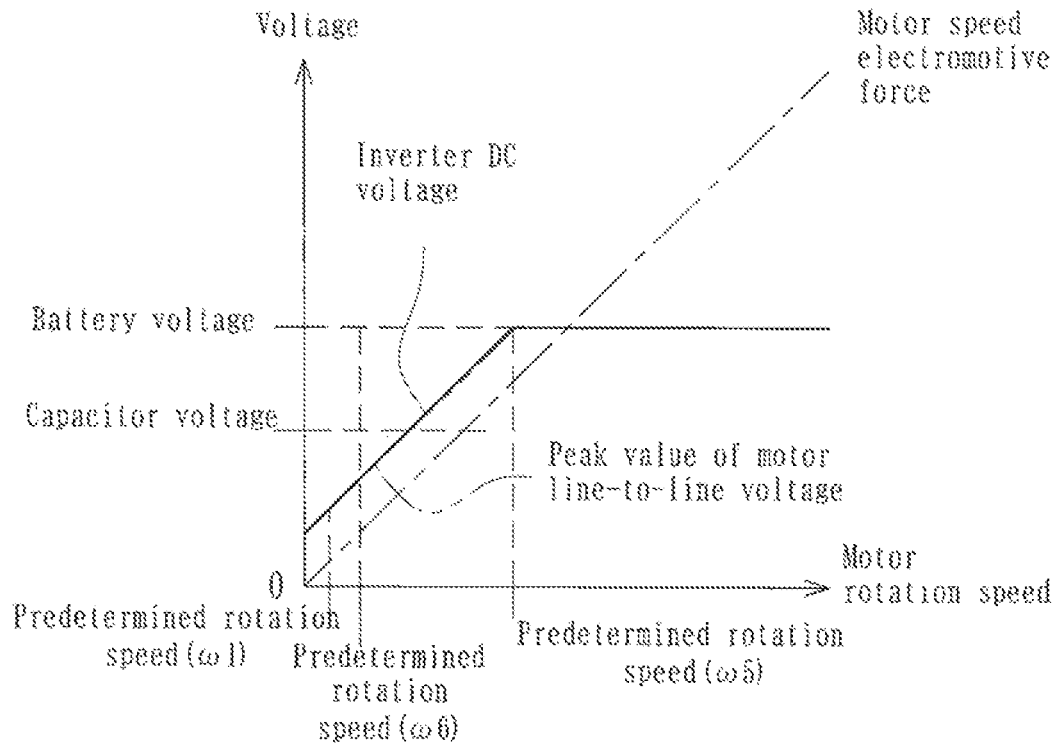

[Fig. 23]
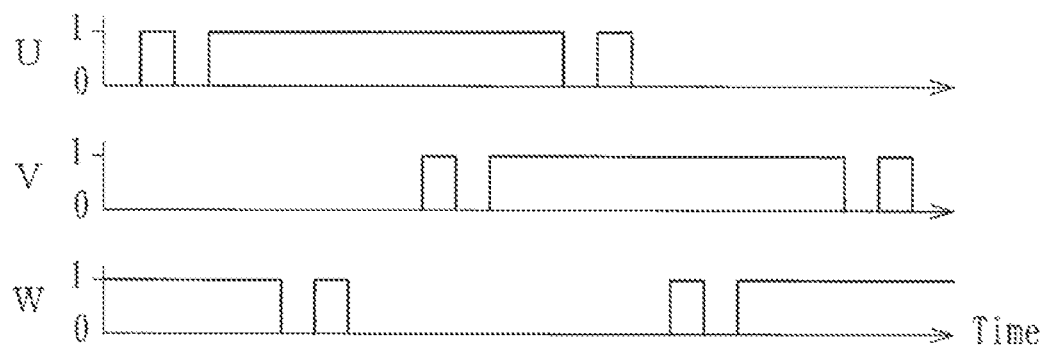
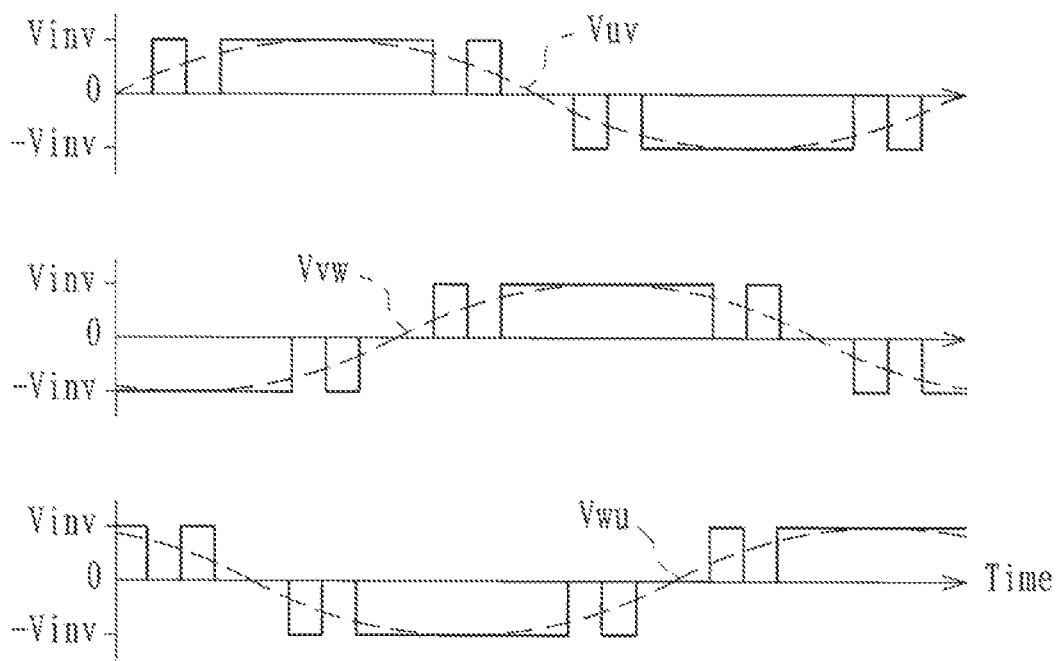
– – – – Fundamental wave of motor line-to-line voltage

[Fig. 24]
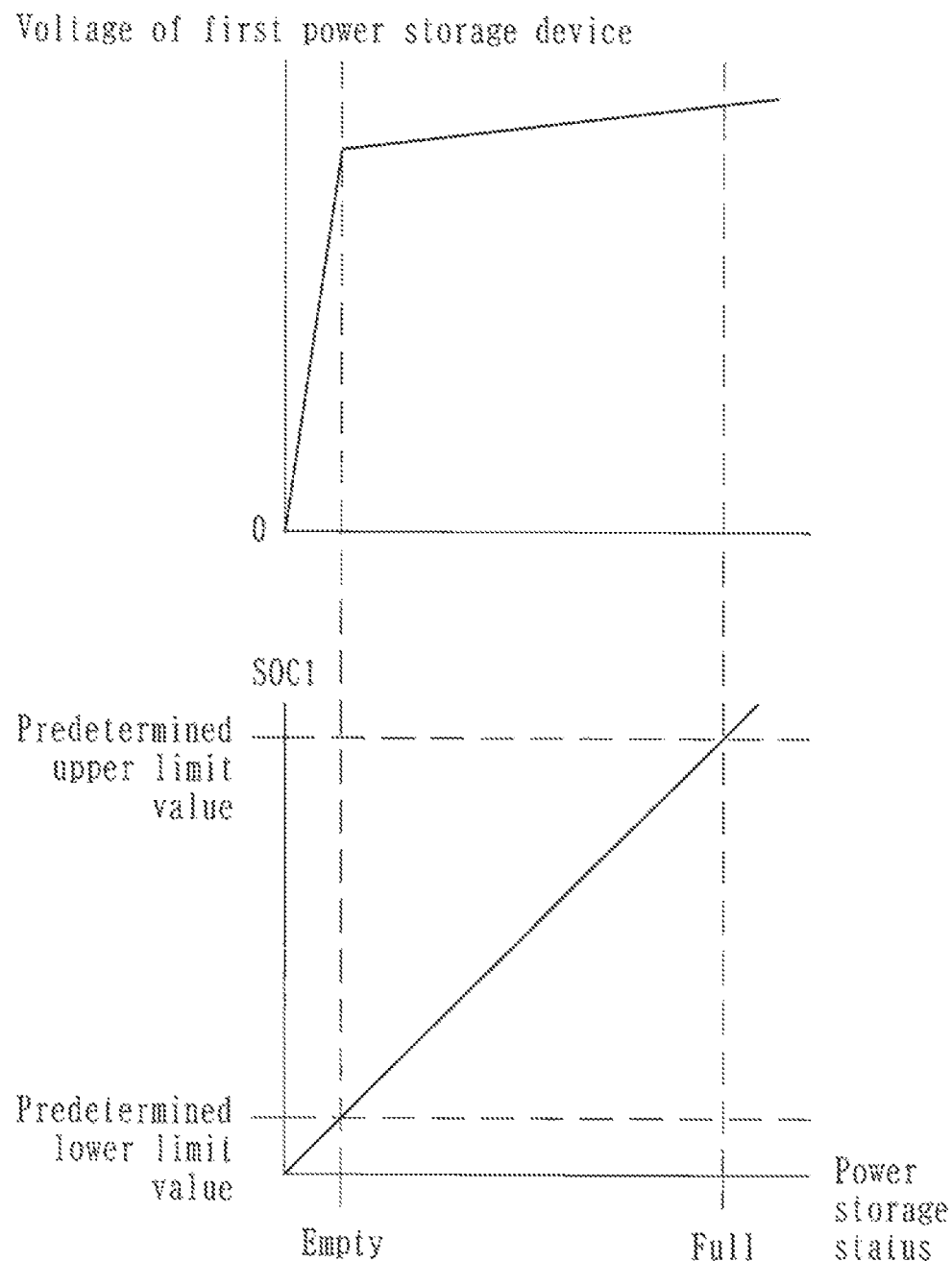

[Fig. 25]
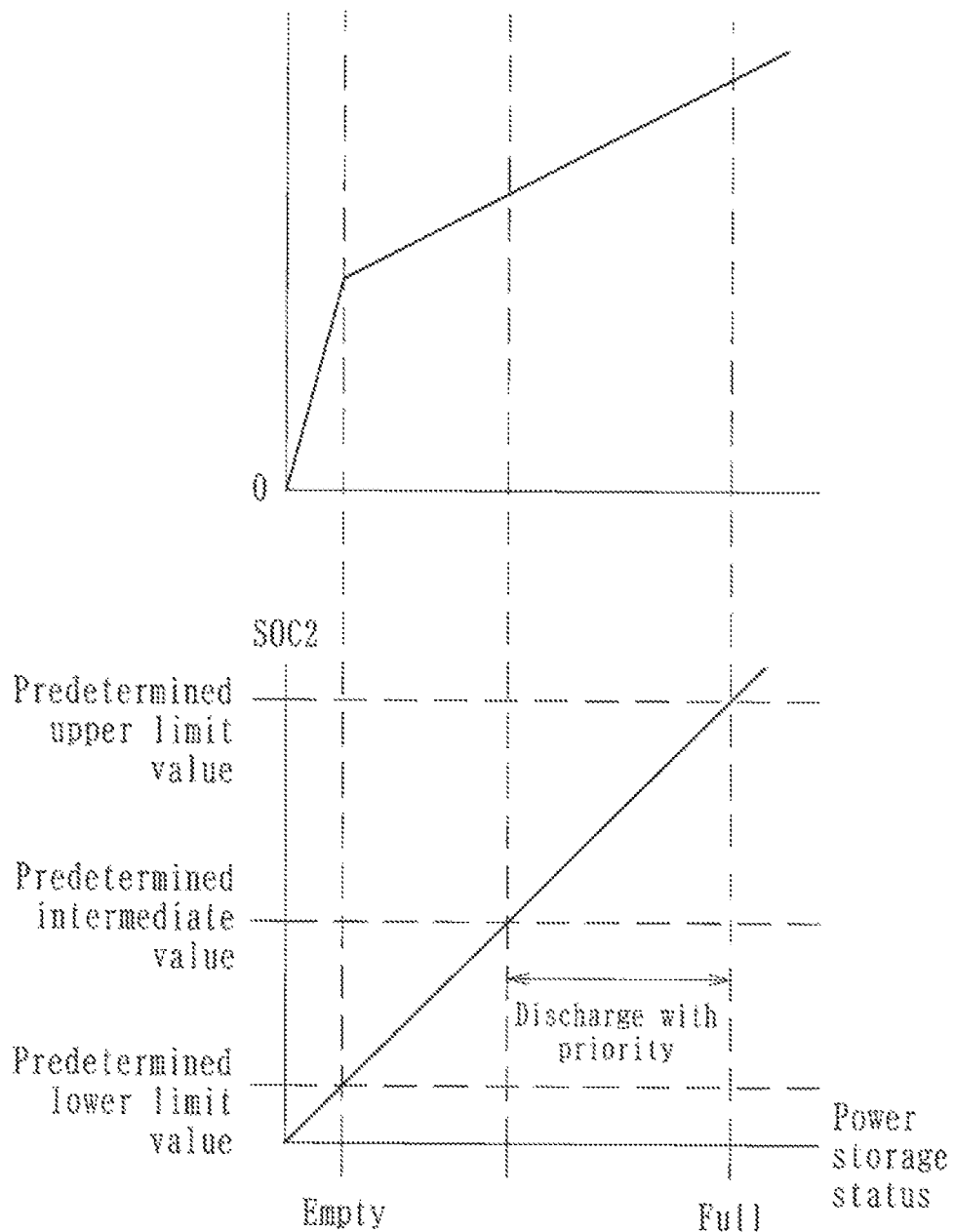

[Fig. 26]

| Combination | Second power storage device: High-power power supply | | | |
|---|---|---|---|---|
| First power storage device: Large-capacity power supply | (3) High-power lithium ion battery | (4) High-power nickel-metal hydride battery | (5) Lithium ion capacitor | (6) Electric double layer capacitor |
| (1) Large-capacity lithium ion battery | ○ | ○ | ○ | ○ |
| (2) Large-capacity nickel-metal hydride battery | ○ | ○ | ○ | ○ |

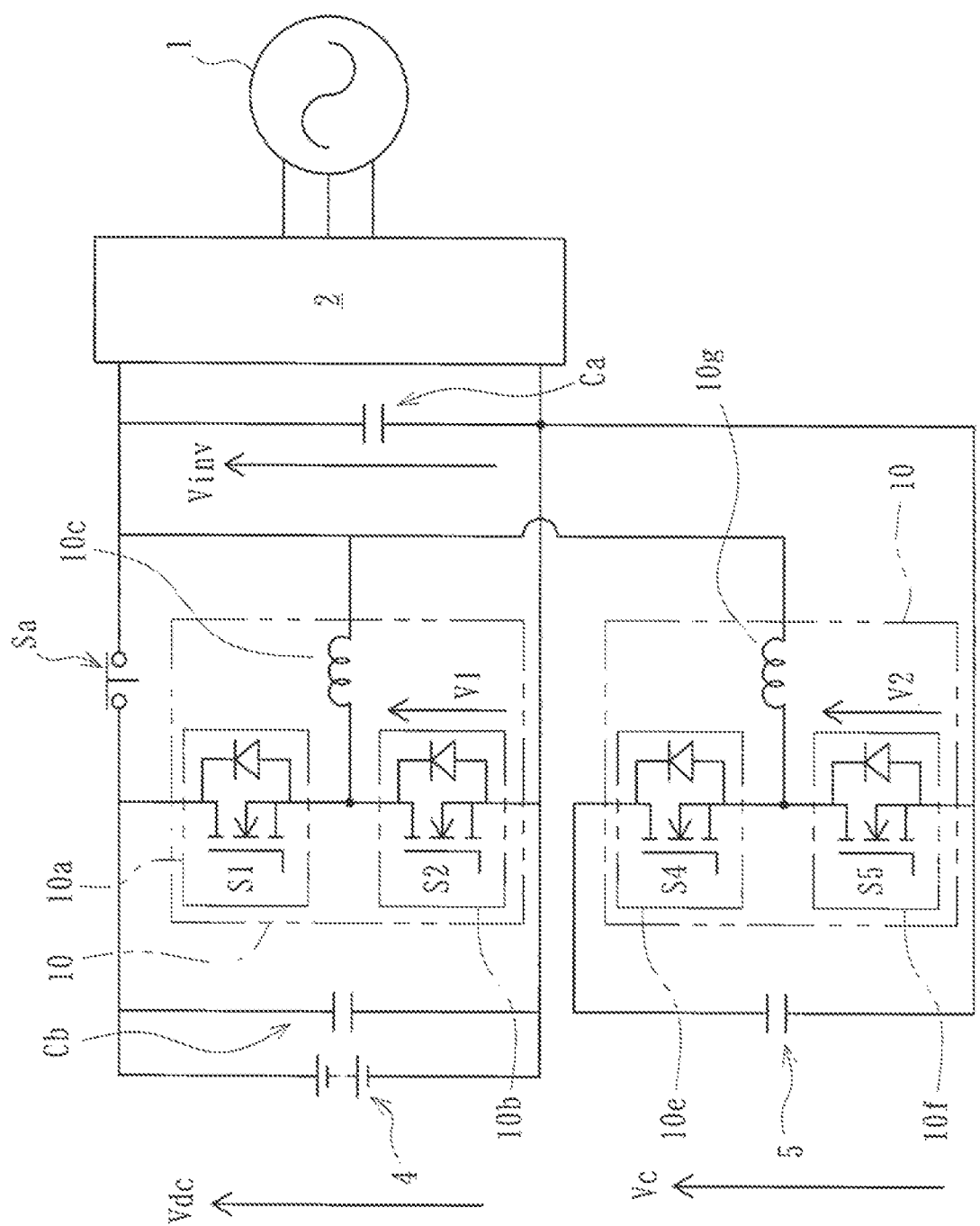
[Fig. 27]

[Fig. 28]
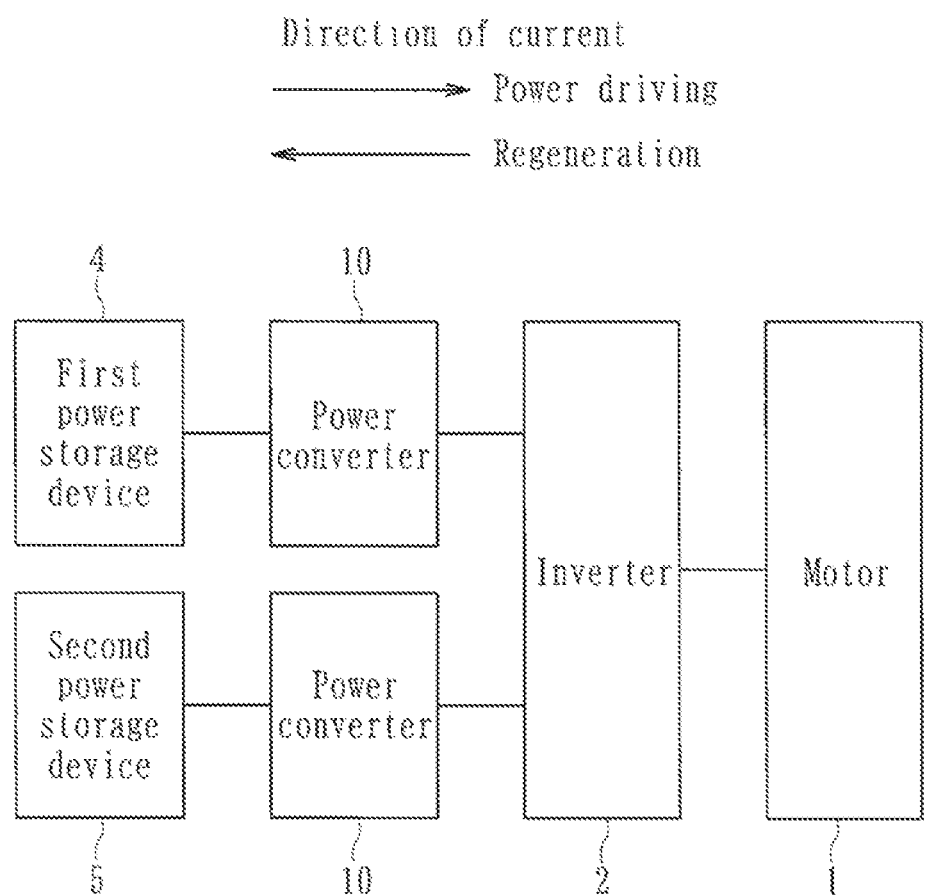

[Fig. 29]

| Motor control | Circuit control mode | | | | | SW | | | | Remarks |
|---|---|---|---|---|---|---|---|---|---|---|
| | PCCNO | Power converter | Use of battery | Use of capacitor | Inverter voltage | S1 | S2 | S4 | S5 | Sa | |
| Power driving | 1 | OFF | O | X | Vinv=Vdc | off | off | off | off | on | |
| | 2 | Step down for power driving | O | X | Vinv=V1<Vdc | duty | duty | off | off | off | |
| | 3 | Step down for power driving | O | O | Vinv=V1=V2<Vdc | duty | duty | duty | duty | off | Vinv characteristics: Table A |
| | 4 | Step down for power driving | X | O | Vinv=V2<Vc | off | off | duty | duty | off | Vinv characteristics: Table A |
| Regeneration | 5 | OFF | O | X | Vinv=Vdc | off | off | off | off | on | |
| | 6 | Step up for regeneration | O | X | Vinv=V1<Vdc | duty | duty | off | off | off | Vinv characteristics: Table B |
| | 7 | Step up for regeneration | O | O | Vinv=V1=V2<Vdc | duty | duty | duty | duty | off | Vinv characteristics: Table B |
| | 8 | Step up for regeneration | X | O | Vinv=V2<Vc | off | off | duty | duty | off | Vinv characteristics: Table B |
| Stop | 9 | OFF | X | X | | off | off | off | off | off | |

MOTOR VEHICLE

CROSS-REFERENCE TO RELATED APPLICATION

This application claims priority to Japanese Application No. 2020-194411, filed Nov. 24, 2020. The disclosure of the above application is incorporating herein by reference.

FIELD

The present disclosure relates to a motor vehicle including a motor performing power driving and regeneration and, more particularly, a power storage device supplying energy to the motor in driving mode and restore energy from motor in regeneration mode.

BACKGROUND

A motor vehicle described in Japanese Unexamined Patent Application Publication No. 2018-166367 is an example of a motor vehicle including a motor performing power driving and regeneration. A power storage device supplies energy to the motor. The motor vehicle can obtain a thrust by a drive force of the motor, and recover the energy into the power storage device by adjusting a braking torque of a driving wheel. According to this motor vehicle, the energy recovered during braking can be stored in the power storage device (battery) and used as drive energy during the power driving.

In the related art described above, power storage devices with different characteristics (large-capacity power storage device and high-power power storage device) are provided. Output voltages of the power storage devices are stepped up in accordance with setting a DC voltage of an inverter. Although the energy necessary for the power driving can be supplied by being shared by both of power storage devices, the step-up ratio of the power converter has a limit. Thus, this causes a problem in that a range of lower limit setting and upper limit setting of the DC voltage of the inverter is limited.

SUMMARY

According to a first aspect of the disclosure, a motor vehicle include a motor performing power driving and regeneration. An inverter converts a direct current into an alternating current. A first power storage device has a large-capacity characteristic. A second power storage device has a high-power characteristic. A power converter has a voltage step down function during the power driving. A circuit with the power converter is connected to the first power storage device and the second power storage device so that the first power storage device and the second power storage device are parallel to each other. During the power driving of the motor, the power converter steps down an output voltage of the first power storage device to supply energy from the first power storage device and the second power storage device to the inverter.

According to a second aspect of the disclosure, the power converter may have voltage step down function during the power driving and a voltage step up function during the regeneration. During the motor power regeneration, the power converter may step up a DC voltage of the inverter to recover the energy into the first power storage device and the second power storage device.

According to a third aspect of the disclosure, the power converter for the first power storage device and the power converter for the second power storage device may share a ground connection switch S2.

According to a fourth aspect of the disclosure, the power converter for the first power storage device and the power converter for the second power storage device may share a reactor 10c.

According to a fifth aspect of the disclosure, charging and discharging may be controlled. Thus, a voltage of the first power storage device becomes equal to or higher than a voltage of the second power storage device.

According to a sixth aspect of the disclosure, determination may be made about a power storage status of the second power storage device based on a voltage of the second power storage device. When a rotation speed of the motor is equal to or lower than a predetermined rotation speed and the power storage status of the second power storage device is equal to or higher than a predetermined intermediate value during the power driving of the motor, the energy may be supplied from the second power storage device to the inverter.

According to a seventh aspect of the disclosure, determination may be made about a power storage status of the second power storage device based on a voltage of the second power storage device. When a rotation speed of the motor is equal to or lower than a predetermined rotation speed and the power storage status of the second power storage device is equal to or lower than a predetermined upper limit value during the regeneration in the motor, regenerated energy may be recovered into the second power storage device.

According to an eighth aspect of the disclosure, during current control of the inverter, a DC voltage of the inverter may be controlled based on a rotation speed of the motor. When the rotation speed of the motor is equal to or lower than a predetermined rotation speed, the DC voltage of the inverter may be controlled to decrease as the rotation speed of the motor decreases.

According to a ninth aspect of the disclosure, when a rotation speed of the motor is equal to or lower than a predetermined rotation speed during current control of the inverter, a DC voltage of the inverter may be controlled based on a peak value of a motor line-to-line voltage.

According to a tenth aspect of the disclosure, the first power storage device may be a large-capacity lithium ion battery or a large-capacity nickel-metal hydride battery. The second power storage device may be a high-power lithium ion battery, a high-power nickel-metal hydride battery, a lithium ion capacitor, or an electric double layer capacitor.

According to the present disclosure, during the power driving of the motor, the power converter steps down the output voltage of the first power storage device to supply the energy from the first power storage device and the second power storage device to the inverter. Therefore, the energy necessary for the power driving can be supplied by being shared by both of the power storage devices. Further, the step-down ratio of the power converter has no limit since the minimum output voltage of the step-down converter is zero voltage. Therefore, the output voltage of the power storage device is stepped down in accordance with the setting of the DC voltage of the inverter. Thus, it is possible to increase the range of lower limit setting and upper limit setting of the inverter DC voltage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic diagram of a motor vehicle.

FIG. 2 is a circuit diagram of a power conversion device of the motor vehicle.

FIG. 3 is a conceptual diagram of the power conversion device of the motor vehicle.

FIG. 4 is a schematic diagram of power control relationships in the motor vehicle.

FIG. 5 is a time chart of power control in the motor vehicle.

FIG. 6 is a flowchart of the overall power control in the motor vehicle.

FIG. 7 is a graph of request characteristics of the motor vehicle (vehicle requests on a driving wheel).

FIG. 8 is a graph of request characteristics of the motor vehicle (motor requests on the driving wheel).

FIG. 9 is a graph of request characteristics of the motor vehicle (vehicle requests on a driven wheel).

FIG. 10 is a graph of request characteristics of the motor vehicle (brake requests on the driven wheel).

FIG. 11 is a flowchart of request process control in the motor vehicle.

FIG. 12 is a graph of a driver's request table of the motor vehicle (Table 1).

FIG. 13 is a graph of a driver's request table of the motor vehicle (Table 2).

FIG. 14 is a graph of a driver's request table of the motor vehicle (Table 3).

FIG. 15 is a graph of a driver's request table of the motor vehicle (Table 4).

FIG. 16 is a flowchart of motor control in the motor vehicle.

FIG. 17 is a flowchart of the motor control in the motor vehicle.

FIG. 18 is a table of power conversion circuit control in the motor vehicle.

FIG. 19 is a graph of a voltage request table of the motor vehicle (Table A in a case of PWM).

FIG. 20 is a graph of a voltage request table of the motor vehicle (Table B in the case of PWM).

FIG. 21 is a graph of a voltage request table of the motor vehicle (Table A in a case depending on a peak value of a motor line-to-line voltage).

FIG. 22 is a graph of a voltage request table of the motor vehicle (Table B in the case depending on the peak value of the motor line-to-line voltage).

FIG. 23 is a time chart of an example of an operation depending on a peak value of a motor line-to-line voltage in a motor vehicle according to another embodiment.

FIG. 24 is a graph of a power storage status of a first power storage device of the motor vehicle.

FIG. 25 is a graph of a power storage status of a second power storage device of the motor vehicle.

FIG. 26 is a table of combinations of power storage devices of the motor vehicle.

FIG. 27 is a circuit diagram of a power conversion device of a motor vehicle according to another embodiment.

FIG. 28 is a conceptual diagram of the power conversion device of the motor vehicle.

FIG. 29 is a table of power conversion circuit control in the motor vehicle.

DETAILED DESCRIPTION

Embodiments of the present disclosure are described below in detail with reference to the drawings.

A motor vehicle according to each of the embodiments is a saddled vehicle such as a motorcycle traveling by using a drive force of a motor. As illustrated in FIGS. 1 to 4, the motor vehicle mainly includes a motor 1, an inverter 2, mechanical brakes (3a, 3b), a first power storage device 4, a second power storage device 5, an accelerator operator 6, a mechanical brake operator 7, a regenerative brake operator 8, a power converter 10, an ECU 11, a start switch 12, and a monitor 13.

The motor 1 is an electromagnetic motor that obtains a drive force by an energy supply. As illustrated in FIGS. 2 and 3, the motor 1 is electrically connectable to the second power storage device 5, the power converter 10, and the first power storage device 4, via the inverter 2. The motor 1 performs power driving and regeneration. The inverter 2 (DC-AC inverter) converts a direct current into an alternating current. In this embodiment, the inverter 2 converts a direct current of the first power storage device 4 or the second power storage device 5 into an alternating current. This supplies the alternating current to the motor 1.

The mechanical brakes perform braking by releasing energy, as typified by a disc brake or a drum brake. The mechanical brakes are a driving-wheel mechanical brake 3a that performs braking by releasing kinetic energy of a driving wheel Ta. A driven-wheel mechanical brake 3b performs braking by releasing kinetic energy of a driven wheel Tb. The driving-wheel mechanical brake 3a and the driven-wheel mechanical brake 3b are connected to the mechanical brake operator 7 via a brake actuator 9.

The mechanical brake operator 7 controls the mechanical brake (driven-wheel mechanical brake 3b) to adjust a braking torque. In this embodiment, an operation lever is attached to the right end of a handle bar. Based on an operation amount of the mechanical brake operator 7, a mechanical brake controller 18 (see FIG. 4) may operate the brake actuator 9 to actuate the driven-wheel mechanical brake 3b.

The accelerator operator 6 controls the motor 1 to adjust a drive torque of the driving wheel Ta. In this embodiment, an accelerator grip is attached to the right end of the handle bar. As illustrated in FIG. 4, based on an operation amount of the accelerator operator 6, an inverter controller 16 may estimate a torque request and operate the motor 1 to obtain a desired drive force. The inverter controller 16 is the main controller provided in the ECU 11.

The power storage devices supply energy to the motor 1. In this embodiment, the power storage devices are the first power storage device 4 and the second power storage device 5. The first power storage device 4 is a storage battery with a large-capacity characteristic. As illustrated in FIG. 26, examples of the first power storage device 4 include a large-capacity lithium ion battery and a large-capacity nickel-metal hydride battery. The second power storage device 5 is a storage battery with a high-power characteristic. As illustrated in FIG. 26, examples of the second power storage device 5 include a high-power lithium ion battery, a high-power nickel-metal hydride battery, a lithium ion capacitor, and an electric double layer capacitor.

The regenerative brake operator 8 control the motor 1 to adjust a braking torque of the driving wheel Ta. Also it recovers the energy into the first power storage device 4 and the second power storage device 5. In this embodiment, an operation lever is attached to the left end of the handle bar. Based on an operation amount of the regenerative brake operator 8, the motor 1 performs regeneration to obtain a desired braking force. Through the regeneration in the motor 1, the energy can be recovered into the first power storage device 4 and the second power storage device 5.

The power converter 10 has a voltage step down function during the power driving of the motor 1 (during energy supply to the motor 1). Also, it has voltage step up function during the regeneration in the motor 1 (during energy recovery from the motor 1). As illustrated in FIGS. 2 and 3, the power converter 10 is connected between the second power storage device 5 and the inverter 2 in an electric circuit. More specifically, as illustrated in FIG. 2, the power converter 10 includes three semiconductor switching elements (MOSFETs) 10a, 10b, and 10d and a reactor 10c (coil). The semiconductor switching elements 10a, 10b, and 10d include switches S1, S2, and S3 (S3L, S3R) and their body diodes, respectively.

In the power converter 10 according to this embodiment, the switches S1, S2, and S3 (S3L, S3R) of the semiconductor switching elements 10a, 10b, and 10d are subjected to high-speed switching (duty control) to step down the voltage during the power driving of the motor 1 (when a current flows rightward in FIG. 3) because the reactor 10c is located on a downstream side of the semiconductor switching elements 10a, 10b, and 10d. Also, it steps up the voltage during the regeneration in the motor 1 (when the current flows leftward in FIG. 3) because the reactor 10c is located on an upstream side of the semiconductor switching elements 10a, 10b, and 10d.

More specifically, this embodiment provides, as illustrated in FIGS. 2 and 3, a circuit where the power converter 10 is connected to the first power storage device 4 and the second power storage device 5. Thus, the power storage devices are parallel to each other. During the power driving of the motor 1, the power converter 10 steps down an output voltage of the first power storage device 4 to supply energy from the first power storage device 4 and the second power storage device 5 to the inverter 2. During the regeneration in the motor 1, the power converter 10 steps up a DC voltage of the inverter 2 to recover the energy into the first power storage device 4 and the second power storage device 5.

In this embodiment, as illustrated in FIG. 2, a switch Sa will be turned ON when the power converter 10 is OFF. This provides a parallel connection of stabilization capacitors Ca and Cb.

In this embodiment, as illustrated in FIG. 2, the power converter 10 for the first power storage device 4 and the power converter 10 for the second power storage device 5 share a ground connection switch (semiconductor switching element 10b) and the reactor 10c. In this embodiment, charging and discharging are controlled so that a voltage of the first power storage device 4 becomes equal to or higher than a voltage of the second power storage device 5.

The ECU 11 controls the motor 1 in response to input driver's requests. As illustrated in FIG. 4, the ECU 11 includes the inverter controller 16, a circuit controller 17, and the mechanical brake controller 18. Also, it is connected to the inverter 2, the power converter 10, the first power storage device 4, the second power storage device 5, and the brake actuator 9. The ECU 11 is configured to detect voltages of the first power storage device 4 and the second power storage device 5. It makes a determination on power storage status of the first power storage device 4 and the second power storage device 5 based on the voltages. FIG. 24 illustrates the power storage status of the first power storage device 4. FIG. 25 illustrates the power storage status of the second power storage device 5.

When the rotation speed of the motor 1 is equal to or lower than a predetermined rotation speed and the power storage status of the second power storage device 5 is equal to or higher than a predetermined intermediate value (see FIG. 25) during the power driving of the motor 1, energy is supplied from the second power storage device 5 to the inverter 2. When the rotation speed of the motor 1 is equal to or lower than the predetermined rotation speed and the power storage status of the second power storage device 5 is equal to or lower than a predetermined upper limit value (see FIG. 25) during the regeneration in the motor 1, regenerated energy is recovered into the second power storage device 5.

The start switch 12 is an operation switch that enables the vehicle to travel. By operating the accelerator operator 6, after the start switch 12 is operated, the motor 1 may be actuated for traveling. The monitor 13 is an auxiliary device such as a liquid crystal monitor attached to the vehicle. For example, the monitor 13 may display conditions of the vehicle (speed, power storage status, or whether malfunction has occurred) or a map of a navigation system.

As illustrated in FIG. 4, this embodiment provides a detector 19, a sensor detecting the rotation speed of the motor 1. When the rotation speed of the motor 1, detected by the detector 19, is equal to or higher than a predetermined value, a predetermined braking torque, based on an operation amount of the regenerative brake operator 8, is generated by regenerative braking. Particularly in this embodiment, it is generated only by the regenerative braking. The maximum value of the predetermined braking torque during the regeneration in the motor 1 is a rated torque of the motor 1.

When the rotation speed of the motor 1, detected by the detector 19, is lower than the predetermined value, a braking torque is generated by the mechanical brake (driving-wheel mechanical brake 3a) based on the operation amount of the regenerative brake operator 8. When the charge level of the first power storage device 4 is equal to or higher than a predetermined value, a braking torque is generated by the mechanical brake (driving-wheel mechanical brake 3a) based on the operation amount of the regenerative brake operator 8.

According to the embodiment, FIG. 5 illustrates changes in parameters in a case where the accelerator operator 6 and the regenerative brake operator 8 are operated after the start switch 12 is turned ON in the motor vehicle. In particular, a capacitor current (Ic) and a capacitor charge level (SOC2) are a current and a charge level of the second power storage device 5 of this embodiment. A battery current (Idc) and a battery charge level (SOC1) are a current and a charge level of the first power storage device 4 of this embodiment. In a table in FIG. 5, "function circuit control number" (FCCNO) corresponds to "FCCNO" in FIGS. 4 and 16 to 18.

Next, according to this embodiment, control on the motor vehicle (main control) is described with reference to a flowchart of FIG. 6.

In S1, determination is first made as to whether the start switch 12 is ON. When determination is made that the start switch 12 is ON, determination is made in S2 as to whether a charge status (Soc1) of the first power storage device 4 is higher than a predetermined lower limit value (see FIG. 24). When determination is made that the charge status (Soc1) is higher than the predetermined lower limit value, a request process (S3), motor control (S4), and mechanical brake control (S5) are performed sequentially.

Next, request characteristics of the motor vehicle according to this embodiment are described with reference to FIGS. 7 to 10.

The characteristics illustrated in FIG. 7 show the relationship between a vehicle speed and both of the drive torque and the braking torque of the driving wheel Ta. The characteristics illustrated in FIG. 8 show the relationship between a motor torque of the driving wheel Ta and a rotation speed (o) of the motor 1. Particularly in a case of high-speed traveling, FIG. 7 illustrates relationships where the drive torque and the braking torque gradually decrease relative to the vehicle speed. In FIG. 8, a positive side, (upper half) from the vertical axis, shows a drive torque based on an operation amount of the accelerator operator 6. A negative side, (lower half) from the vertical axis, shows a braking torque based on an operation amount of the regenerative brake operator 8. In FIG. 8, reference symbol Tm1 represents the rated torque of the motor 1.

The characteristics illustrated in FIG. 9 show the relationship between the vehicle speed and a braking torque of the driven wheel Tb. The characteristics illustrated in FIG. 10 show the relationship between a braking torque of the driven wheel Tb (mechanical braking torque (Tbmf)) and the rotation speed ($\omega$) of the motor 1. Since FIGS. 9 and 10 illustrate the characteristics of the driven wheel Tb, only a negative side (lower half) from the vertical axis shows the characteristics (braking torques).

Next, according to this embodiment, control on the motor vehicle (request process control) is described with reference to a flowchart of FIG. 11.

In S1, determination is first made as to whether the regenerative system is normal based on whether a malfunction signal is generated. When determination is made that the malfunction signal is not generated, determination is made in S2 as to whether the accelerator operator 6 is operated (whether an accelerator operation amount Ap is larger than 0). When determination is made that the accelerator operator 6 is operated larger than 0, the process proceeds to S4 for motor driving mode. A motor torque (Tm), based on the operation amount of the accelerator operator 6, is calculated with reference to Table 1 illustrated in FIG. 12.

After the calculation in S4, a mechanical braking torque (Tbmr), based on an operation amount of the regenerative brake operator 8, is calculated in S7 with reference to Table 3 illustrated in FIG. 14. A mechanical braking torque (Tbmf), based on an operation amount of the mechanical brake operator 7, is calculated in S10 with reference to Table 4 illustrated in FIG. 15. When determination is made in S2 that the accelerator operator is not operated, determination is made in S3 as to whether the regeneration in the motor 1 is possible. In S3, determination is made that the regeneration in the motor 1 is possible when the power storage status (Soc1) of the first power storage device 4 is equal to or lower than a predetermined upper limit value (see FIG. 24) and the rotation speed of the motor is equal to or higher than $\omega$1 (see FIG. 8).

When determination is made in S3 that the regeneration in the motor 1 is possible, the process proceeds to S5. A motor torque (Tm), based on the operation amount of the regenerative brake operator 8, is calculated with reference to Table 2 illustrated in FIG. 13. In the calculation of the motor torque (Tm), with reference to Table 2, when the rotation speed of the motor 1 is equal to or lower than a predetermined rotation speed ($\omega$2) illustrated in FIG. 8, a correction is made such that Tm=Tm($\omega$−$\omega$1)/($\omega$2−$\omega$1). After the calculation in S5, the mechanical braking torque (Tbmr) is set to 0 in S8, and then S10 is performed as described above.

When determination is made in S1 that the malfunction signal is generated or when determination is made in S3 that the regeneration is not possible, the process proceeds to S6. The motor torque (Tm) is set to 0. Then, the process proceeds to S9, and a mechanical braking torque (Tbmr), based on the operation amount of the regenerative brake operator 8, is calculated with reference to Table 3 illustrated in FIG. 14. This occurs after the calculation in S9, S10 is performed as described above.

Next, according to this embodiment, control on the motor vehicle (motor control) is described with reference to flowcharts of FIGS. 16 and 17.

In S1, determination is first made as to whether the regenerative system is normal based on whether the malfunction signal is generated. When determination is made that malfunction has occurred, the process proceeds to S15, and FCCNO is set to 9. Then, power conversion control (S20) and inverter control (S21) are performed sequentially. When determination is made in S1 that the malfunction signal is not generated, determination is made in S2 as to whether the accelerator operator 6 is operated (whether the accelerator operation amount Ap is larger than 0). When determination is made that the accelerator operator 6 is operated larger than 0, determination is made in S3 as to whether the rotation speed of the motor 1 is higher than $\omega$4 (see FIGS. 19 and 21).

When determination is made in S3 that the rotation speed of the motor 1 is higher than $\omega$4, determination is made in S4 as to whether the rotation speed of the motor 1 is lower than $\omega$3 (see FIGS. 19 and 21). When determination is made that the rotation speed of the motor 1 is not lower than $\omega$3, the process proceeds to S7, and FCCNO is set to 1. When determination is made in S4 that the rotation speed of the motor 1 is lower than $\omega$3, determination is made in S5 as to whether a power storage status (Soc2) of the second power storage device 5 is lower than a predetermined lower limit value (see FIG. 25). When determination is made that the power storage status (Soc2) of the second power storage device 5 is lower than the predetermined lower limit value, the process proceeds to S8, and FCCNO is set to 2.

When determination is made in S3 that the rotation speed of the motor 1 is not higher than A, determination is made in S6 as to whether the power storage status (Soc2) of the second power storage device 5 is lower than the predetermined intermediate value (see FIG. 25). When determination is made that the power storage status (Soc2) of the second power storage device 5 is lower than the predetermined intermediate value or when determination is made in S5 that the power storage status (Soc2) of the second power storage device 5 is not lower than the predetermined lower limit value, the process proceeds to S9, and FCCNO is set to 3. When determination is made in S6 that the power storage status (Soc2) of the second power storage device 5 is not lower than the predetermined intermediate value (see FIG. 25), the process proceeds to S10, and FCCNO is set to 4. After S7 to S10 are performed, S20 and S21 are performed sequentially as described above.

When determination is made in S2 that the accelerator operator 6 is not operated, determination is made in S11 as to whether the regeneration in the motor 1 is possible. In S11, determination is made that the regeneration in the motor 1 is possible when the power storage status (Soc1) of the first power storage device 4 is equal to or lower than the predetermined upper limit value (see FIG. 24) and the rotation speed of the motor is equal to or higher than (01 (see FIG. 8). When determination is made in S11 that the regeneration in the motor 1 is not possible, the process proceeds to S15, and FCCNO is set to 9.

When determination is made in S11 that the regeneration in the motor 1 is possible, determination is made in S12 as to whether the power storage status (Soc2) of the second power storage device 5 is equal to or higher than the predetermined upper limit value (see FIG. 25). When determination is made that the power storage status (Soc2) of the second power storage device 5 is equal to or higher than the predetermined upper limit value, determination is made in S13 as to whether the rotation speed of the motor 1 is lower than ω3. When determination is made in S13 that the rotation speed of the motor 1 is not lower than ω3, the process proceeds to S16, and FCCNO is set to 5. When determination is made in S13 that the rotation speed of the motor 1 is lower than ω3, the process proceeds to S17, and FCCNO is set to 6.

When determination is made in S12 that the power storage status (Soc2) of the second power storage device 5 is not equal to or higher than the predetermined upper limit value, determination is made in S14 as to whether the rotation speed of the motor 1 is higher than ω4 (see FIGS. 19 and 21). When determination is made that the rotation speed of the motor 1 is higher than ω4, FCCNO is set to 7 in S18. When determination is made that the rotation speed of the motor 1 is not higher than ω4, FCCNO is set to 8 in S19. After S15 to S19 are performed, S20 and S21 are performed sequentially as described above.

The control in S20 is performed with reference to a control table of FIG. 18. The following are details of the control in the control table.

When FCCNO=1, the switches S1, S2, and S3 of the semiconductor switching elements 10a, 10b, and 10d are turned OFF (the power converter 10 is turned OFF), and the switch Sa is turned ON. In the control table, "use of capacitor" means "use of second power storage device 5".

When FCCNO=2, the switches S1 and S2 of the semiconductor switching elements 10a and 10b are subjected to duty control during the power driving. Thus, the power converter 10 steps down the output voltage of the first power storage device. Further, the switch S3 of the semiconductor switching element 10d and the switch Sa are turned OFF. When FCCNO=2, current control of the inverter 2 is performed with reference to Table A illustrated in FIG. 19.

According to Table A, when the current control of the inverter 2 is performed under PWM control, the DC voltage of the inverter 2 is controllable based on the rotation speed (ω) of the motor 1 as illustrated in FIG. 19. When the rotation speed of the motor 1 is equal to or lower than the predetermined rotation speed (ω3), the DC voltage of the inverter 2 is controlled to decrease as the rotation speed of the motor 1 decreases.

When FCCNO=3, the switches S1, S2, and S3 of the semiconductor switching elements 10a, 10b, and 10d are subjected to duty control during the power driving. Thus, the power converter 10 steps down the output voltage of the first power storage device. Further, the switch Sa is turned OFF. Also in this case, the current control of the inverter 2 is performed with reference to Table A illustrated in FIG. 19.

When FCCNO=4, the switch S1 of the semiconductor switching element 10a is turned OFF, and the switches S2 and S3 of the semiconductor switching elements 10b and 10d are subjected to duty control during the power driving. Thus, the power converter 10 steps down the output voltage of the second power storage device. Further, the switch Sa is turned OFF. Also in this case, the current control of the inverter 2 is performed with reference to Table A illustrated in FIG. 19.

When FCCNO=5, the switches S1, S2, and S3 of the semiconductor switching elements 10a, 10b, and 10d are turned OFF (the power converter 10 is turned OFF), and the switch Sa is turned ON. When FCCNO=9, the switches S1, S2, and S3 of the semiconductor switching elements 10a, 10b, and 10d are turned OFF (the power converter 10 is turned OFF), and the switch Sa is turned OFF.

When FCCNO=6, the switches S1 and S2 of the semiconductor switching elements 10a and 10b are subjected to duty control during the regeneration. Thus, the power converter 10 steps up the inverter DC voltage. The regenerative energy of the motor 1 is stored only in the first power storage device 4. Further, the switch S3 and the switch Sa are turned OFF. When FCCNO=6, the current control of the inverter 2 is performed with reference to Table B illustrated in FIG. 20.

According to Table B, when the current control of the inverter 2 is performed under the PWM control, the DC voltage of the inverter 2 is controllable based on the rotation speed (w) of the motor 1 as illustrated in FIG. 20. When the rotation speed of the motor 1 is equal to or lower than a predetermined rotation speed (ω5), the DC voltage of the inverter 2 is controlled to decrease as the rotation speed of the motor 1 decreases.

When FCCNO=7, the switches S1, S2, and S3 of the semiconductor switching elements 10a, 10b, and 10d are subjected to duty control during the regeneration. Thus, the power converter 10 steps up the inverter DC voltage. The regenerative energy of the motor 1 is stored in the first power storage device 4 and the second power storage device 5. Further, the switch Sa is turned OFF. Also in this case, the current control of the inverter 2 is performed with reference to Table B illustrated in FIG. 20.

When FCCNO=8, the switch S1 of the semiconductor switching element 10a is turned OFF, and the switches S2 and S3 of the semiconductor switching elements 10b and 10d are subjected to duty control during the regeneration. Thus, the power converter 10 steps up the inverter DC voltage. The regenerative energy of the motor 1 is stored only in the second power storage device 5. Further, the switch Sa is turned OFF. Also in this case, the current control of the inverter 2 is performed with reference to Table B illustrated in FIG. 20.

In the embodiment described above, Tables A and B are applied on the premise that the current control of the inverter 2 is performed under the pulse width modulation (PWM) control. Instead, the current control of the inverter 2 may depend on a peak value of a motor line-to-line voltage considering Pulse Amplitude Modulation (PAM) technique. That is, the PWM control is control for changing a width of a switching frequency (pulse width) (changing a current flow rate of the inverter) relative to the predetermined inverter DC voltage. However, the control depending on the peak value of the motor line-to-line voltage is a control for changing the DC voltage of the inverter depending on the peak value of the motor line-to-line voltage as illustrated in FIGS. 21 to 23.

In the case where the current control of the inverter 2 is performed under the control depending on the peak value of the motor line-to-line voltage, in Table A illustrated in FIG. 21, the DC voltage of the inverter 2 is controlled based on the peak value of the motor line-to-line voltage when the rotation speed of the motor 1 is equal to or lower than the predetermined rotation speed (ω3). In Table B, control is performed as illustrated in FIG. 22. FIG. 23 is a time chart illustrating an example of a switching operation of the inverter circuit and behavior of the motor line-to-line voltage and a fundamental wave of the motor line-to-line voltage in a case where the current is controlled with reference to either one of the tables in FIGS. 21 and 22. The inverter DC voltage is equal to the peak value of the motor line-to-line voltage. In this time chart, the inverter DC voltage (Vinv) agrees with a peak value of the fundamental wave of the motor line-to-line voltage.

In the motor vehicle, according to the embodiment described above, during the power driving of the motor 1, the power converter 10 steps down the output voltage of the first power storage device 4 to supply the energy from the first power storage device 4 and the second power storage device 5 to the inverter 2. Therefore, the energy necessary for the power driving can be shared by the both of power storage devices. In this embodiment, the first power storage device 4 and the second power storage device 5. Further, the step-down ratio of the power converter has no limit since the minimum output voltage of the step-down converter is zero voltage. Therefore, the output voltage of the power storage device is stepped down in accordance with setting of the DC voltage of the inverter 2. Thus, it is possible to increase a range of lower limit setting and upper limit setting of the inverter DC voltage.

Particularly when the inverter DC voltage is adjusted to a voltage lower than the voltage of the first power storage device 4, the adjustment can be made through the duty control on the switches S1, S2, and S3. Therefore, the power driving energy to be supplied can be shared by the first power storage device 4 and the second power storage device 5. Thus, the current of the first power storage device 4 can be made smaller than that in a case where the same amount of power driving energy is supplied only by the first power storage device 4. When the power driving energy is large, a high current needs to flow. By sharing the power driving energy between the first power storage device 4 and the second power storage device 5, the current of the first power storage device 4 can be reduced, thereby suppressing deterioration of the first power storage device 4.

The power converter 10, according to this embodiment, has the function of stepping down the voltage during the power driving and the function of stepping up the voltage during the regeneration. During the regeneration in the motor 1, the power converter 10 steps up the DC voltage of the inverter 2 to recover the energy into the first power storage device 4 and the second power storage device 5. Therefore, the to be stored regenerated energy can be shared by the first power storage device 4 and the second power storage device 5. Thus, the current of the first power storage device 4 can be made smaller than that in a case where the same amount of regenerated energy is stored only in the first power storage device 4. When the regenerated energy is large, a high current needs to flow. By sharing the recovered energy between the first power storage device 4 and the second power storage device 5, the current of the first power storage device 4 can be reduced, thereby suppressing deterioration of the first power storage device 4.

According to this embodiment, the power converter 10 for the first power storage device 4 and the power converter 10 for the second power storage device 5 share the ground connection switch 10b. Therefore, the number of components connected to the circuit can be reduced. Similarly, according to this embodiment, the power converter 10 for the first power storage device 4 and the power converter 10 for the second power storage device 5 share the reactor 10c. Therefore, the number of components connected to the circuit can be reduced.

As illustrated in FIGS. 27 to 29, ground connection switches may be provided in the power converter 10 for the first power storage device 4 and in the power converter 10 for the second power storage device 5 without the share. Reactors may be provided in the power converter 10 for the first power storage device 4 and in the power converter 10 for the second power storage device 5 without the share. For example, as illustrated in FIG. 27, the semiconductor switching elements 10a and 10b and the reactor 10c of the power converter 10 are connected to a circuit on the first power storage device 4 side. Semiconductor switching elements 10e and 10f and a reactor 10g of the power converter 10 are connected to a circuit on the second power storage device 5 side. Thus, they are connected in parallel to the circuit on the first power storage device 4 side.

As illustrated in FIG. 29, the switches S1 and S2, of the semiconductor switching elements 10a and 10b of the power converter 10 are in the circuit on the first power storage device 4 side. Switches S4 and S5, of the semiconductor switching elements 10e and 10f of the power converter 10, are in the circuit on the second power storage device 5 side. The switches are turned ON or OFF or subjected to duty control depending on FCCNO. Thus, the energy can be supplied and recovered during the power driving and the regeneration similarly to the embodiment described above.

In this embodiment, the charging and the discharging are controlled so that the voltage (Vdc) of the first power storage device 4 becomes equal to or higher than the voltage (Vc) of the second power storage device 5. Therefore, backflow of the current from the second power storage device 5 to the first power storage device 4 can be prevented when the switch S3 is OFF. That is, the backflow of the current from the second power storage device 5 to the first power storage device 4 occurs when the charging and the discharging are not controlled. Thus, the voltage of the first power storage device 4 becomes equal to or higher than the voltage of the second power storage device 5. Therefore, backflow prevention switches are needed separately. In the embodiment illustrated in FIGS. 27 and 28, even when the charging and the discharging are not controlled, so that the voltage of the first power storage device 4 becomes equal to or higher than the voltage of the second power storage device 5, the backflow of the current from the second power storage device 5 to the first power storage device 4 can be avoided by turning OFF the switch Sa.

According to this embodiment, determination can be made about the power storage status of the second power storage device 5 based on the voltage of the second power storage device 5. When the rotation speed of the motor 1 is equal to or lower than the predetermined rotation speed and the power storage status of the second power storage device 5 is equal to or higher than the predetermined intermediate value during the power driving of the motor 1, the energy is supplied from the second power storage device 5 to the inverter 2. Therefore, the energy in the second power storage device 5 can be used with priority. Thus, the energy stored in the second power storage device 5 can be reduced more quickly than in a case where the energy is supplied to the inverter 2 from both the first power storage device 4 and the second power storage device 5. Accordingly, more regenerated energy can be stored in the second power storage device 5, for example, when the regeneration is performed on a long downhill after the start of the vehicle.

According to this embodiment, determination can be made about the power storage status of the second power storage device 5 based on the voltage of the second power storage device 5. When the rotation speed of the motor 1 is equal to or lower than the predetermined rotation speed and the power storage status of the second power storage device 5 is equal to or lower than the predetermined upper limit value during the regeneration in the motor 1, the regenerated energy is recovered into the second power storage device 5. Therefore, the regenerated energy can be stored in a range covering lower-speed rotation than in a case where the regenerated energy is stored in the first power storage device 4 and the second power storage device 5. This is because when the voltage of the first power storage device 4 is higher than the voltage of the second power storage device 5, the regeneration in low-speed rotation is performed by stepping up the voltage due to the low DC voltage of the inverter. However, the step-up ratio of the power converter has a limit, for example, the boost ratio is about five times. Therefore, the power storage device having a lower voltage can store the regenerated energy in the range covering lower-speed rotation.

During the current control of the inverter 2, the DC voltage of the inverter 2 is controllable based on the rotation speed of the motor 1. When the rotation speed of the motor 1 is equal to or lower than the predetermined rotation speed, the DC voltage of the inverter 2 is controlled to decrease as the rotation speed of the motor 1 decreases. Therefore, the DC voltage of the inverter 2 can be reduced during low-speed rotation, and instantaneous power of the switches can be reduced. Thus, the switching loss can be reduced during the low-speed rotation.

When the rotation speed of the motor 1 is equal to or lower than the predetermined rotation speed during the current control of the inverter 2, the DC voltage of the inverter 2 is controlled based on the peak value of the motor line-to-line voltage. Therefore, a fixed PAM switching pattern for reducing the low-order harmonic component, having a switching frequency that is about three times as high as the fundamental waveform frequency, can be used as the switching pattern. Thus, the switching frequency can become $\frac{1}{30}$ or lower than switching frequency in the PWM control (duty control at a constant inverter DC voltage). The switching loss can become $\frac{1}{30}$ or lower than switching loss in the PWM control.

Although the embodiments are described above, the present disclosure is not limited to those embodiments. For example, the first power storage device 4 may be a power storage device in another form having a larger-capacity characteristic than the second power storage device 5, or the second power storage device 5 may be a power storage device in another form having a higher-power characteristic than the first power storage device 4. The semiconductor switching element may be an IGBT in place of the MOSFET. The present disclosure may be applied to a vehicle without the monitor 13, or to a three-wheel or four-wheel vehicle such as a buggy.

The present disclosure is also applicable to a motor vehicle with a different appearance or with other functions as long as the power converter steps down the output voltage of the first power storage device during the power driving of the motor to supply energy from the first power storage device and the second power storage device to the inverter.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A motor vehicle comprising:
a motor performing power driving and regeneration;
an inverter converting a direct current into an alternating current;
a first power storage device with a large-capacity characteristic;
a second power storage device with a high-power characteristic;
a powerconverter having a voltage step down function during the power driving; and
a circuit where the power converter is connected to the first power storage device and the second power storage device so that the first power storage device and the second power storage device are parallel to each other,
wherein, during the power driving of the motor, the power converter steps down an output voltage of the first power storage device to supply energy from the first power storage device and the second powerstorage device to the inverter,
wherein the power converter has the voltage step down function during the power driving and a voltage step up function during the regeneration, and
wherein, during the regeneration in the motor, the power converter steps up a DC voltage of the inverter to recover the energy into the first power storage device and the second power storage device.

2. The motor vehicle according to claim 1, wherein the power converter for the first power storage device and the power converter for the second power storage device share a ground connection switch.

3. The motor vehicle according to claim 1, wherein the power converter for the first power storage device and the power converter for the second power storage device share a reactor.

4. The motor vehicle according to claim 1, wherein charging and discharging are controlled so that a voltage of the first power storage device becomes equal to or higher than a voltage of the second power storage device.

5. The motor vehicle according to claim 1,
wherein determination is made about a power storage status of the second power storage device based on a voltage of the second power storage device, and
when a rotation speed of the motor is equal to or lower than a predetermined rotation speed and the power storage status of the second power storage device is equal to or higher than a predetermined intermediate value during the power driving of the motor, the energy is supplied from the second power storage device to the inverter.

6. The motor vehicle according to claim 1,
wherein determination is made about a power storage status of the second power storage device based on a voltage of the second power storage device, and
when a rotation speed of the motor is equal to or lower than a predetermined rotation speed and the power storage status of the second power storage device is equal to or lower than a predetermined upper limit value during the regeneration in the motor, regenerated energy is recovered into the second power storage device.

7. The motor vehicle according to claim 1,
wherein, during current control of the inverter, a DC voltage of the inverter is controlled based on a rotation speed of the motor, and
when the rotation speed of the motor is equal to or lower than a predetermined rotation speed, the DC voltage of the inverter is controlled to decrease as the rotation speed of the motor decreases.

8. The motor vehicle according to claim 1, wherein, when a rotation speed of the motor is equal to or lower than a predetermined rotation speed during current control of the inverter, a DC voltage of the inverter is controlled based on a peak value of a motor line-to-line voltage.

9. The motor vehicle according to claim 1,
wherein the first power storage device is a large-capacity lithium ion battery or a large-capacity nickel-metal hydride battery, and
the second power storage device is a high-power lithium ion battery, a high-power nickel-metal hydride battery, a lithium ion capacitor, or an electric double layer capacitor.

\* \* \* \* \*

UNITED STATES PATENT AND TRADEMARK OFFICE
CERTIFICATE OF CORRECTION

PATENT NO. : 11,850,947 B2
APPLICATION NO. : 17/527853
DATED : December 26, 2023
INVENTOR(S) : Takaharu Takeshita et al.

It is certified that error appears in the above-identified patent and that said Letters Patent is hereby corrected as shown below:

In the Specification

Column 7
Line 12                delete "(o)" and insert --($\omega$)--

Column 8
Line 46                delete "A," and insert --$\omega 4$,--

Column 9
Line 2                 delete "(01" and insert --$\omega 1$--

Column 10
Line 23                delete "(w)" and insert --($\omega$)--

In the Claims

Column 14
Line 16, Claim 1       delete "powerconverter" and insert --power converter--
Line 25, Claim 1       delete "powerstorage" and insert --power storage--

Signed and Sealed this
Twenty-seventh Day of August, 2024

Katherine Kelly Vidal
*Director of the United States Patent and Trademark Office*